(12) United States Patent
Syrakvasha

(10) Patent No.: US 11,382,333 B2
(45) Date of Patent: Jul. 12, 2022

(54) EDIBLE TABLEWARE AND METHOD OF MAKING THE SAME

(71) Applicant: ECO WARE CORP., Brooklyn, NY (US)

(72) Inventor: Ruslan Syrakvasha, Gomel Region (BY)

(73) Assignee: ECO WARE CORP., Brooklyn, NY (US)

( * ) Notice: Subject to any disclaimer, the term of this patent is extended or adjusted under 35 U.S.C. 154(b) by 0 days.

(21) Appl. No.: 16/585,767

(22) Filed: Sep. 27, 2019

(65) Prior Publication Data
US 2020/0100508 A1    Apr. 2, 2020

Related U.S. Application Data

(60) Provisional application No. 62/737,307, filed on Sep. 27, 2018.

(51) Int. Cl.
*A21D 13/48*    (2017.01)
*A21D 2/18*    (2006.01)
(Continued)

(52) U.S. Cl.
CPC ............. *A21D 13/48* (2017.01); *A21D 2/165* (2013.01); *A21D 2/181* (2013.01); *A21D 6/003* (2013.01); *A47G 19/03* (2013.01)

(58) Field of Classification Search
CPC .................... A21D 13/48; A47G 2400/105
See application file for complete search history.

(56) References Cited

U.S. PATENT DOCUMENTS 6,423,357 B1    7/2002 Woods et al.
2009/0274801 A1*  11/2009 Sasaki .................. A21B 3/13
426/138
(Continued)

FOREIGN PATENT DOCUMENTS

WO    2006135989 A1    12/2006
WO    2016140627 A1    9/2016
(Continued)

OTHER PUBLICATIONS

Boss, Cakes & chemistry: the science of baking, The Columbus Dispatch, accessed: May 22, 2021 <https://www.dispatch.com/article/20131122/NEWS/311229879> (Year: 2013).*

(Continued)

*Primary Examiner* — Viren A Thakur
*Assistant Examiner* — Thanh H Nguyen
(74) *Attorney, Agent, or Firm* — Amster, Rothstein & Ebenstein LLP

(57) ABSTRACT

Edible tableware made from a baked dough capable of holding warm liquids for an extended period of time without leakage and a method of making the same. Edible tableware has recently become an area of interest due to a desire to provide more environmentally friendly options for disposable tableware. In disposable tableware, when using paper instead of plastic, the paper that is used to make the disposable tableware is liquid resistant due to a wax or plastic coating. Existing edible tableware has taken a similar approach and uses a heavy sugar glaze as a way of keeping liquids from penetrating into the baked part of the tableware. The use of a sugar glaze is not ideal because an imperfect glazing or too light of a glazing can result in liquid penetrating the baked portion and causing leakage and/or structural failure. Further, the extra sugar contained in the glazing may be undesirable to the consumer. Accordingly, there is a (Continued)

need for edible tableware that does not require a separate glaze for liquid resistance.

9 Claims, 16 Drawing Sheets

(51) Int. Cl.
*A21D 6/00* (2006.01)
*A21D 2/16* (2006.01)
*A47G 19/03* (2006.01)

(56) References Cited

U.S. PATENT DOCUMENTS

2010/0297317 A1* 11/2010 Valerius .............. A21D 13/33
426/391

2014/0272010 A1* 9/2014 DeLaprym .............. A21D 8/02
426/95
2019/0380519 A1 12/2019 Bhagat et al.
2020/0100508 A1 4/2020 Syrakvasha

FOREIGN PATENT DOCUMENTS

| WO | 2016168421 A1 | 10/2016 |
|---|---|---|
| WO | 2018157119 A1 | 8/2018 |

OTHER PUBLICATIONS

Stackexchange, What is the maximum time for which the dough should be allowed to rest before making Parathas?, Accessed May 22, 2021 <https://cooking.stackexchange.com/questions/28805/what-is-the-maximum-time-for-which-the-dough-should-be-allowed-to-rest-before-ma>, (Year: 2012).*

PCT Search Report and Written Opinion dated Feb. 12, 2021 in connection with PCT International Patent Application No. PCT/US2020/52723.

* cited by examiner

EDIBLE TABLEWARE AND METHOD OF MAKING THE SAME

CROSS-REFERENCE TO RELATED APPLICATIONS

The present application claims the benefit of and priority to U.S. Provisional Patent Application Ser. No. 62/737,307, entitled "EDIBLE TABLEWARE AND METHOD OF MAKING THE SAME," filed on Sep. 27, 2018, the contents of which is incorporated herein by reference in its entirety.

FIELD OF THE INVENTION

The present invention is directed to edible tableware made from a flour-based dough and a method for making the same. The edible tableware may include, but is not limited to, cups, bowls, mugs, plates, spoons and straws.

BRIEF DESCRIPTION OF THE DRAWINGS

Exemplary embodiments of the present invention will be described with references to the accompanying figures, wherein:

FIG. 1A-2 is an exemplary top view of the edible tableware of FIG. 1A-1 in accordance with exemplary embodiments of the present invention;

FIG. 1B-1 is an exemplary side view of another edible tableware in accordance with exemplary embodiments of the present invention;

FIG. 1B-2 is an exemplary top view of the edible tableware of FIG. 1B-1 in accordance with exemplary embodiments of the present invention;

FIG. 1C-1 is an exemplary side view of yet another edible tableware in accordance with exemplary embodiments of the present invention;

FIG. 1C-2 is an exemplary top view of the edible tableware of FIG. 1C-1 in accordance with exemplary embodiments of the present invention;

FIG. 2 is an exemplary diagram illustrating the Waterfastness Rating;

SUMMARY OF THE INVENTION

Figures 1, 1A:
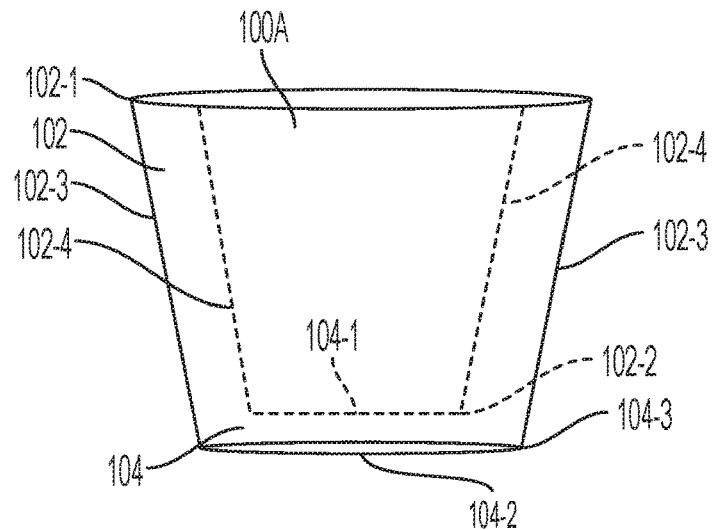
FIG. 1A-1 is an exemplary side view of an edible tableware in accordance with exemplary embodiments of the present invention.

In an embodiment of the present invention, a method of making edible tableware includes preparing a dough from a mixture of water, flour, eggs, sugar, salt and butter or margarine wherein the dough is cooled to a temperature of 3-10° C. after kneading and kept at this temperature for at least 8 hours prior to being placed into a mold and baked at a temperature of 200-260° C. to form one or more items of liquid resistant edible tableware.

In an embodiment, the dough is prepared by initially mixing the eggs, sugar and salt with water, warming the mixture to 50° C. and subsequently adding in the butter or margarine, heating the mixture to 55° C. and adding in the sifted flour and then mixing the mixture for about three minutes.

In an embodiment, the dough is cooled to room temperature over a period of about 4-6 hours before being kneaded for about three minutes in a first kneading step.

In an embodiment, the dough is rested after the first kneading step for about an hour after which water is added to the dough and the dough is kneaded in a second kneading step for about 10-15 minutes.

In embodiments, the dough may include flavorings and/or colorants.

In embodiments, the edible tableware may be cups, plates, bowls, mugs, or utensils such as straws and spoons.

In embodiments, the edible tableware may include a decorative glaze or other decorations on the exterior of the tableware. In embodiments, a glaze may be added to a liquid contacting surface of the edible tableware to extend the liquid resistance of the edible tableware.

In an exemplary embodiment of the invention, the dough is prepared through a multi-step process. In embodiments, as a first step, the eggs, sugar and salt, as well as any dye or flavorings are mixed together with water. In embodiments, the mixture is warmed to 50° C. after which a shortening (which can be or include butter or margarine) is added and mixed. The mixture, in embodiments, is then heated to a temperature of about 55° C. In embodiments, the sifted flour is then introduced to the mixture and is mixed at a relatively slow speed for about three minutes to form a dough. The dough is may then be covered and cooled to room temperature over a period of 4-6 hours.

In an exemplary embodiment of the invention, the starting dough is made up of about 46-48% flour, about 19% sugar, about 9% eggs, about 17% butter/margarine, about 6% water and about 1-2% salt and other additives such as coloring and flavoring.

After the dough has cooled and rested, in embodiments, the dough is added to a mechanical kneading machine and is kneaded for about three minutes. The dough may then be exposed to room temperature and/or rested at room temperature for another hour. After resting, more water is added to the dough and the dough is kneaded a second time for about 10-15 minutes. In embodiments, the amount of water that is added is about 15-20% of the initial amount of water used to make the dough. Following this second kneading step, in embodiments, the dough is cooled to a temperature between 3° C. and 10° C. and rested for at least 8-10 hours.

After resting, in embodiments, the cooled dough is molded in the shape of an edible article, examples of which include cups, bowls, mugs, straws and plates. The dough may then be baked at a temperature of between 200° C. and 260° C. In embodiments, smaller articles, such as cups and utensils may be baked at a temperature between 220° C. and 260° C. for a time period of about 3-7 minutes. In embodiments, larger articles, such as bowls and plates may be baked at a temperature between 200° C. and 240° C. for a time period of about 7-10 minutes.

In embodiments, a method for creating edible tableware may comprise: (a) preparing dough by performing the following steps: (1) making a first mixture by combining at least the following: (A) eggs; (B) sugar; (C) salt; and (D) a first amount of water; (2) warming the first mixture to substantially fifty degrees Celsius; (3) making a second mixture by combining the first mixture with a shortening including one or more of: (A) butter; and (B) margarine; (4) warming the second mixture to substantially fifty-five degrees Celsius; (5) making a third mixture by mixing at least the second mixture and flour for substantially three minutes; and (6) cooling the third mixture to substantially room temperature over a first time range between and including four hours and six hours, wherein the cooled third mixture is the dough; (b) kneading the dough for substantially three minutes; (c) exposing the dough for substantially one hour, wherein the dough is at room temperature at the expiration of substantially one hour; (d) making a fourth mixture by combining the dough with a second amount of water; (e) kneading the fourth mixture for a second time range between and including ten minutes and fifteen minutes; (f) cooling the fourth mixture to a first temperature range between and including three degrees Celsius and ten degrees Celsius; (g) resting the fourth mixture for substantially three minutes; (h) molding at least a portion of the fourth mixture via a mold by placing the at least a portion of the fourth mixture into the mold, wherein the mold is a tableware shape; (i) baking the at least a portion of the fourth mixture in the mold at a predetermined temperature for a predetermined amount of time, wherein the predetermined temperature is based at least in part on the tableware shape, and wherein the predetermined amount of time is based at least in part on the tableware shape; and (j) removing the at least a portion of the fourth mixture from the mold, wherein the baked at least a portion of the fourth mixture is an edible tableware comprising at least a base having a first side on an interior end of the base and a second side on an exterior end of the base, wherein the base has a first predetermined thickness spanning the first side to the second side, and wherein the edible tableware has a Waterfastness Rating of at least forty minutes.

In embodiments, the edible tableware is a cup and further comprises: (1) a side wall including a first end and a second end, wherein the first end is at least partially in contact with the first side of the first wall, wherein the base and the side wall form the shape of a cup, wherein a first majority portion of the side wall between the first end and the second end has a first thickness of less than three millimeters, and wherein a second majority portion of the base has a thickness of less than six millimeters. In embodiments, the edge has a third thickness of less than five millimeters. In embodiments, the Waterfastenss rating of the edible tableware is at least fifty minutes. In embodiments, the predetermined temperature is a second temperature range between and including two-hundred-twenty degrees Celsius and two-hundred-sixty degrees Celsius. In embodiments, the predetermined amount of time is a third time range between and including three minutes and seven minutes.

In embodiments, the tableware shape is at least one of the following: (1) a cup; (2) a bowl; (3) a mug; (4) a straw; (5) a utensil; and (6) a plate;

In embodiments, the predetermined temperature is a third temperature range between and including two-hundred degrees Celsius and two-hundred-sixty degrees Celsius.

In embodiments, the predetermined amount of time is a fourth time range between and including three minutes and ten minutes.

In embodiments, the second amount of water is between 14 percent and 21 percent of the first amount of water.

In embodiments, in edible tableware having a cup shape comprises: (a) a base having a substantially circular shape comprising: (1) a radial end located along a first radial distal edge of the base, wherein the base has a top side and a bottom side, and wherein the base has a first thickness of less than six millimeters; and (b) a sidewall moldably attached at a first end of the sidewall to the radial end of the base, the sidewall comprising: (1) the first end located adjacent to the base; and (2) a second end located along a third radial edge of the sidewall, wherein the second end has a second thickness of less than five millimeters, and wherein the sidewall has an inside wall and an outside wall, wherein a majority portion of the sidewall between the first end and the second end has a third thickness of less than three millimeters, and wherein the edible tableware has a Waterfastness Rating of at least forty minutes.

In embodiments, the edible tableware further comprises: (c) a sugar-based glaze covering a substantial majority of the top side of the base and the inside wall of the sidewall, wherein the Waterfastness Rating of the edible tableware prior to addition of the glaze is at least fifty minutes. In embodiments, the sugar-based glaze further covers a substantial majority of the bottom side of the base and the outside wall of the sidewall, and wherein the Waterfastness Rating of the edible tableware prior to addition of the glaze is at least 60 minutes.

In embodiments, the first thickness is greater than or equal to the third thickness.

In embodiments, the first thickness is less than or equal to the third thickness.

In embodiments, the edible tableware further comprises: (c) a handle coupled to the outside wall of the side wall.

In embodiments, the edible tableware further comprises: (c) an edible straw having a first opening at a first end of the edible straw and a second opening at a second end of the edible straw, wherein the edible straw is hollow between the first opening and the second opening, wherein the edible straw is coupled to one or more of the sidewall and the base.

In embodiments, the edible tableware is made from a composite mixture having a weight made up of: (1) between 45 percent and 49 percent flour; (2) between 18 percent and 20 percent sugar; (3) between 8 percent and 10 percent eggs; (4) between 16 percent and 18 percent shortening; (5) between 5 percent and 7 percent water; and (6) below 3 percent salt.

DETAILED DESCRIPTION

The present invention is generally directed to edible tableware made from a flour-based dough and methods for making the same. Edible tableware, as used herein, may refer to tableware that is edible for a human being and/or animal (e.g. pet).

FIG. 1A-1 is an exemplary side view of edible tableware 100A in accordance with exemplary embodiments of the present invention. As shown in FIG. 1A-1, in embodiments, edible tableware 100A may have a tableware shape of a cup. The shape of a cup, as shown herein, is a generic shape of a cup. It is understood that an edible tableware may have a different shape and still be a "cup shape" consistent with the disclosure herein. The measurement, used herein, for an item of edible tableware's ability to hold heated liquids for an extended amount of time is the Waterfastness Rating. A more detailed description of the Waterfastness Rating is located below in connection with the description of FIG. 2, the description of which applying herein.

In embodiments, the edible tableware 100 may include a sidewall 102 moldably connected to a base 104 by baking dough in a cup-shaped mold.

The sidewall 102, in embodiments, may have a first end 102-2 a second end 102-1, an outside wall 102-3, and an inside wall 102-4. The first end 102-2, as shown in FIG. 1A-1, may be adjacent to the base 104. The second end 102-1, in embodiments, may be the distal end of the sidewall 102 from the perspective of base 104. In embodiments the second end 102-1 may include an edge along at least a portion of the top of the sidewall 102. The edge of the sidewall 102, in embodiments, may have a thickness that is greater than the thickness of a majority of the sidewall between the first end 102-2 and the second end 102-1. For example, the edge of the sidewall 102 may form a lip around the circumference of the cup shaped edible tableware 100A. The outside wall 102-3, in embodiments and as shown in the top view depicted in FIG. 1A-2, may be the outer perimeter of the sidewall 102. The inside wall 102-4, in embodiments and as shown in the top view depicted in FIG. 1A-2, may be the inner perimeter of the sidewall 102. In embodiments, the thickness of the sidewall 102 may be the distance between the outside wall 102-3 and the inside wall 102-4.

The base 104, in embodiments, may have a top side 104-1, a bottom side 104-2, and/or a radial end 104-3. The top side 104-1, in embodiments, may be the side of the base 104 that is visible in the top view of the edible tableware 100A shown in FIG. 1A-2. The bottom side 104-2, in embodiments, may be along the bottom of the base 104. The radial end 104-3, in embodiments, may be the outer perimeter of the base 104. The base 104, in embodiments, may also include a center. The center of the base 104 may be a point on the base that is at the center of the base.

In embodiments, the thickness of the sidewall 102 may be one to two millimeters (e.g. between one and two millimeters, including one millimeter and two millimeters). In embodiments, the thickness of the sidewall 102 may be less than three millimeters (e.g. between 0 millimeters and 3 millimeters). As mentioned above, the thickness of the sidewall 102 may differ from the thickness of the second end 102-1 (e.g. the edge). For example, the thickness of the sidewall 102 may be less than three millimeters and the second end 102-1 may have a thickness of four millimeters. In embodiments, the second end 102-1 and/or the edge may have a thickness up to four millimeters. In embodiments, the second end 102-1 and/or the edge may have a thickness of less than five millimeters. In embodiments, the thickness of the base 104 may be around five millimeters. In embodiments, the thickness of the base 104 may be less than six millimeters (e.g. between 0 and six millimeters). In embodiments, the thickness of the base 104 may be less than the thickness of the sidewall 102. For example, the thickness of the base 104 may be five millimeters and the thickness of the sidewall 102 may be six millimeters. In embodiments, the thickness of the base 104 may be the same or substantially similar to the thickness of the sidewall 102. For example, the thickness of both the base 104 and the sidewall 102 may be six millimeters.

In embodiments, the thickness of the sidewall 102, the thickness of the base 104, and the thickness of the second end 102-1 may vary by design. For example, the thickness of the sidewall 102 may be thinner towards the top of the sidewall 102 and thicker towards the bottom of the sidewall 102. As another example, the base 104 and sidewall 102 may be thicker at the point(s) of contact between the base 104 and the sidewall 102.

In embodiments, the edible tableware 100A may have a sugar-based glaze along a substantial majority of the inside wall 102-4 and the top side 104-1. As another example, the sugar-based glaze may cover a substantial majority of the base 104 and the sidewall 102. While the type of glaze, in embodiments, may improve the water resistance of the edible tableware 100A and the ingredients of the sugar-based glaze, it is not needed to obtain the benefits of the invention.

Figures 1, 1B:
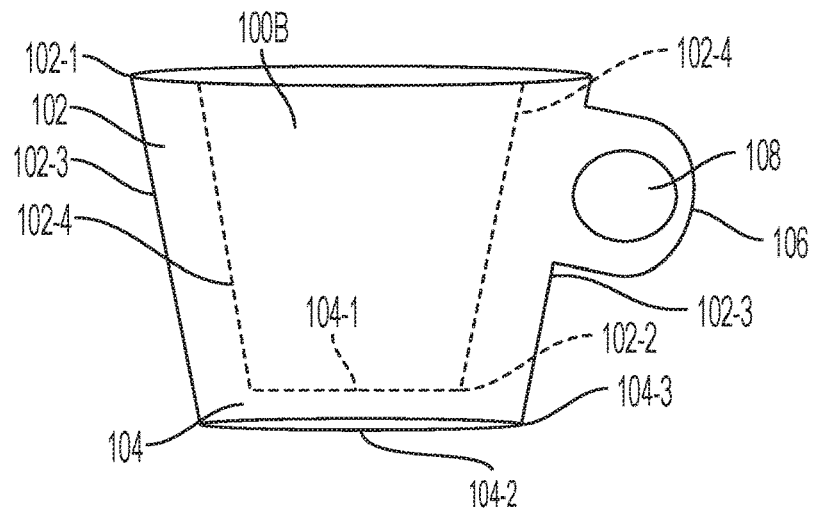
Figures 1, 1C:
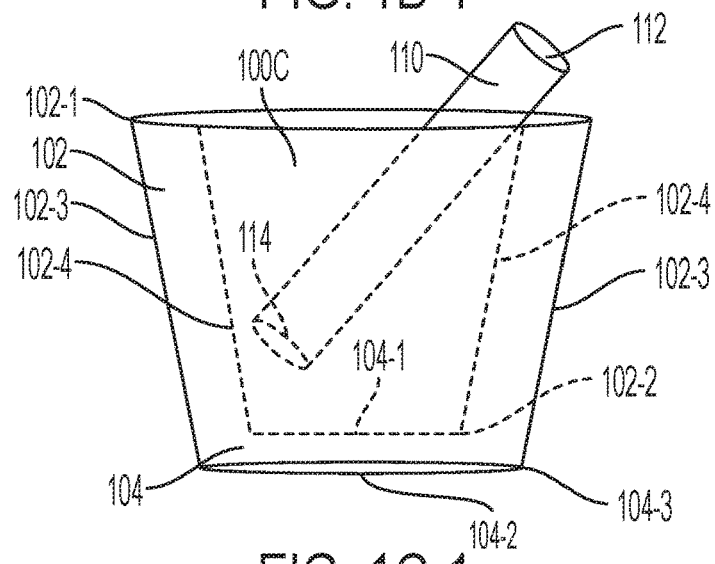
Figures 1, 1A, 2:
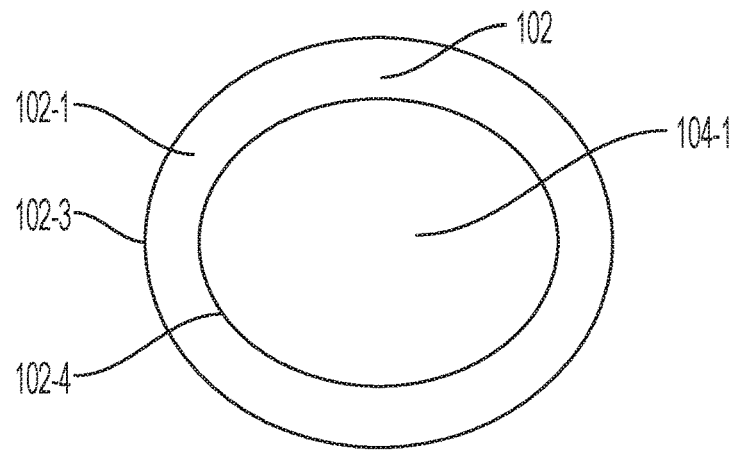
Figures 1, 1B, 2:
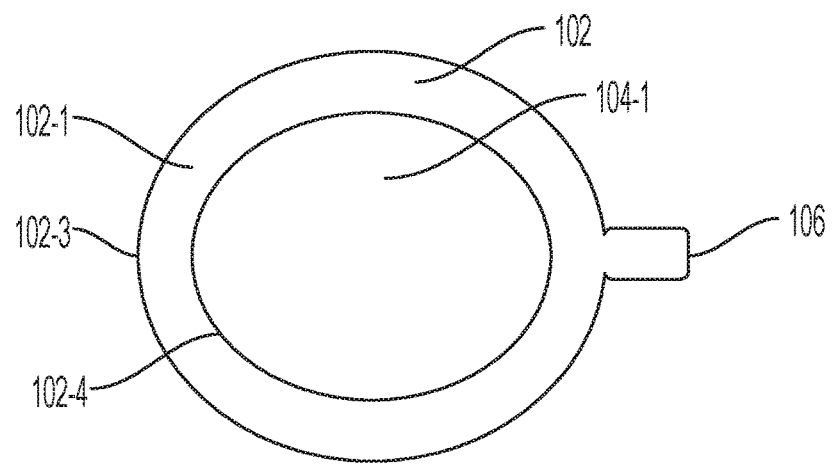
Figures 1, 1C, 2:
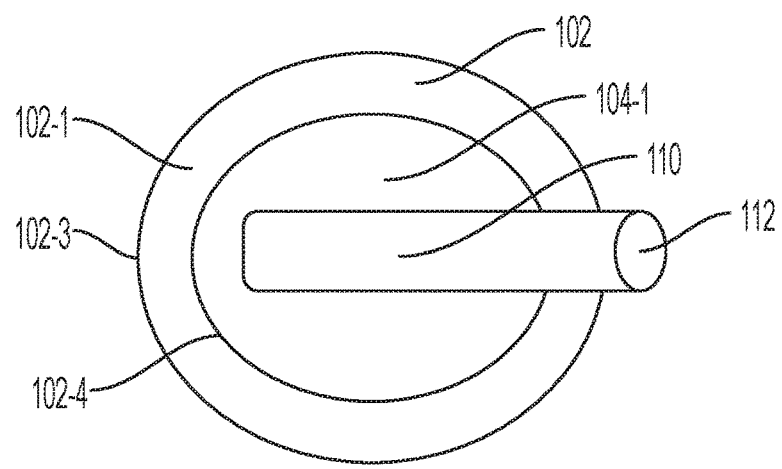
Figure 2:
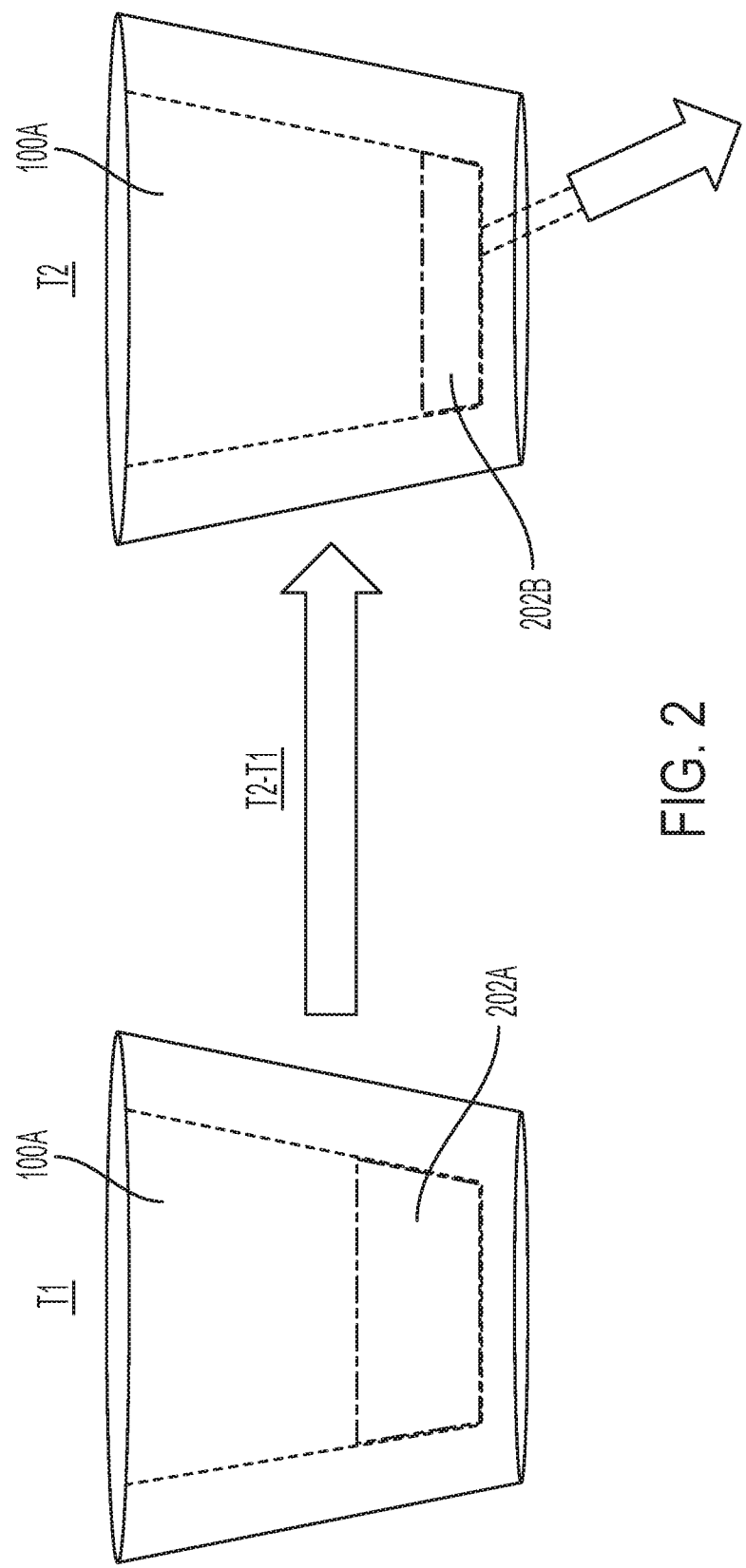

In embodiments, an edible tableware may have a tableware shape of a cup and include a handle. Referring to FIGS. 1B-1 and 1B-2, the edible tableware 100B may include sidewall 102, base 104, and handle 106. The handle 106, in embodiments, may optionally include hole 108. In embodiments, the edible tableware 100B may be made using more than one mold. For example, a first mold may be used to shape the handle 106 and a second mold may be used to shape the remainder of the edible tableware 100B. After baking the two pieces that make up edible tableware 100B, the handle 106, in embodiments, may be coupled to the outside wall 102-3. The handle 106, in embodiments, may be coupled using an edible adhesive. In embodiments, the edible tableware 100B may be made using one mold.

In embodiments, an edible tableware may have a tableware shape of a cup and include an edible straw having a straw tableware shape. Referring to FIGS. 1C-1 and 1C-2, the edible tableware 100C may include sidewall 102, base 104, and straw 110. The straw 110, in embodiments, may have a first opening 112 at a first end of the straw 110 and a second opening 114 at a second end of the straw 110. The straw 110, in embodiments, may be hollow between the first opening 112 and the second opening 114, allowing liquids and/or solids to move from the second opening 114 to the first opening 112 (and vice versa). The edible tableware 100C may also be made using more than one mold. For example, a first mold may be used to shape the straw 110 and a second mold may be used to shape the remainder of the edible tableware 100C. After baking the two pieces that make up edible tableware 100C, the straw 110, in embodiments, may be coupled to one or more of the following: the second end 102-1 (e.g. edge), the sidewall 102, the inside wall 102-4, the base 104, and/or the top side 104-1, to name a few. The straw 110, in embodiments, may be coupled using an edible adhesive. In embodiments, the edible tableware 100C may be made using one mold. In embodiments, the straw 110 may be separate from edible tableware 100C.

As referred to herein, the thickness of the sidewall 102 (e.g. the thickness between the outside wall 102-3 and the inside wall 102-4) may be: the mean thickness of the sidewall 102, the median thickness of the sidewall 102, the mode thickness of the sidewall 102 (e.g. the thickness across the majority of the sidewall 102 between the outside wall 102-3 and the inside wall 102-4), the thickness of the sidewall 102 in between the first end 102-2 and the second end 102-1, and/or a combination thereof, to name a few. As referred to herein, the thickness of a base 104 (e.g. between the top side 104-1 and the bottom side 104-2) may be: the mean thickness of the base 104, the median thickness of the base 104, the mode thickness of the base 104, the thickness of the base 104 in between the center of the base 104 and the radial end 104-3 of the base 104, and/or a combination thereof, to name a few.

Figure 3A:
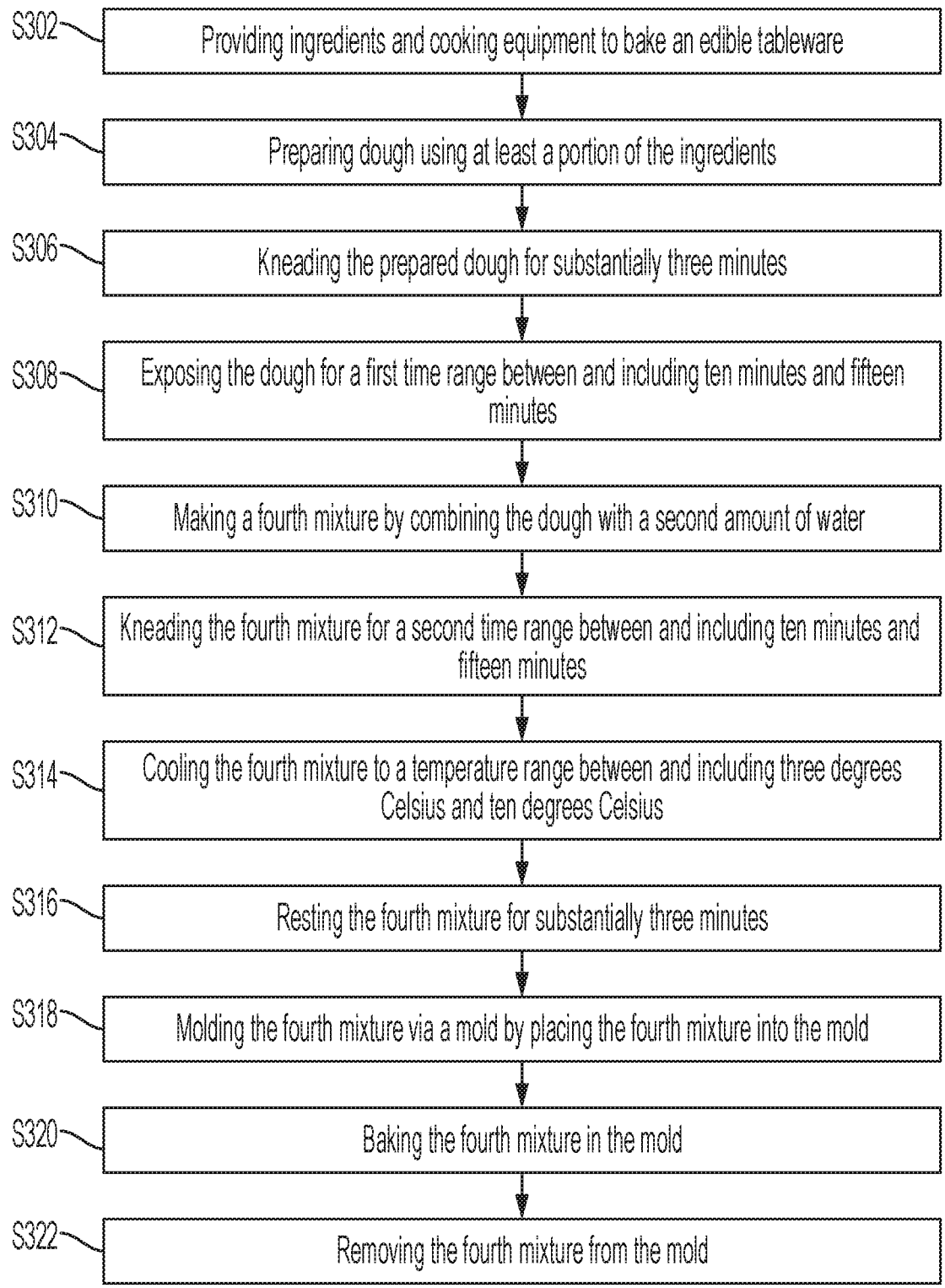
FIG. 3A is an exemplary flow chart illustrating a process for making an edible tableware in accordance with exemplary embodiments of the present invention.
Figure 3B:
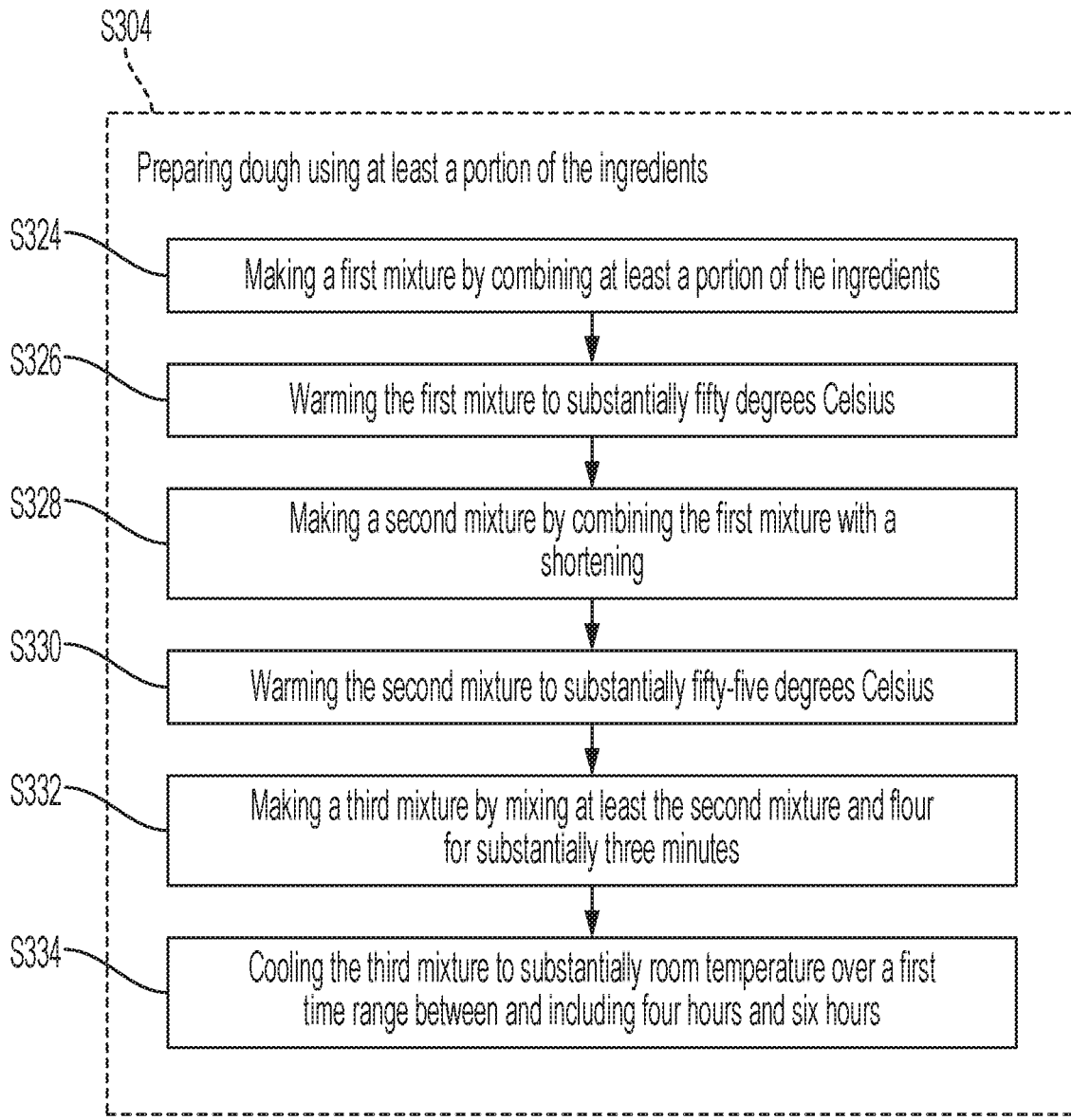
FIG. 3B is an exemplary flow chart illustrating a process for preparing dough to make edible tableware in accordance with exemplary embodiments of the present invention.
Figure 4A:
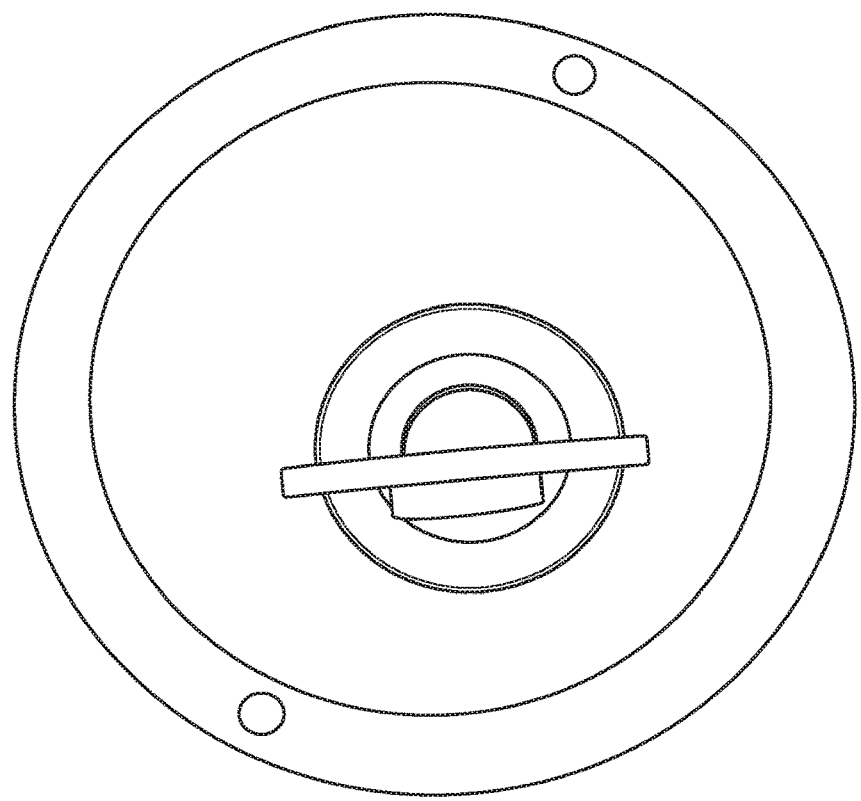
FIGS. 4A-4L are illustrations of exemplary molds for making edible tableware in accordance with exemplary embodiments of the present invention.
Figure 4B:
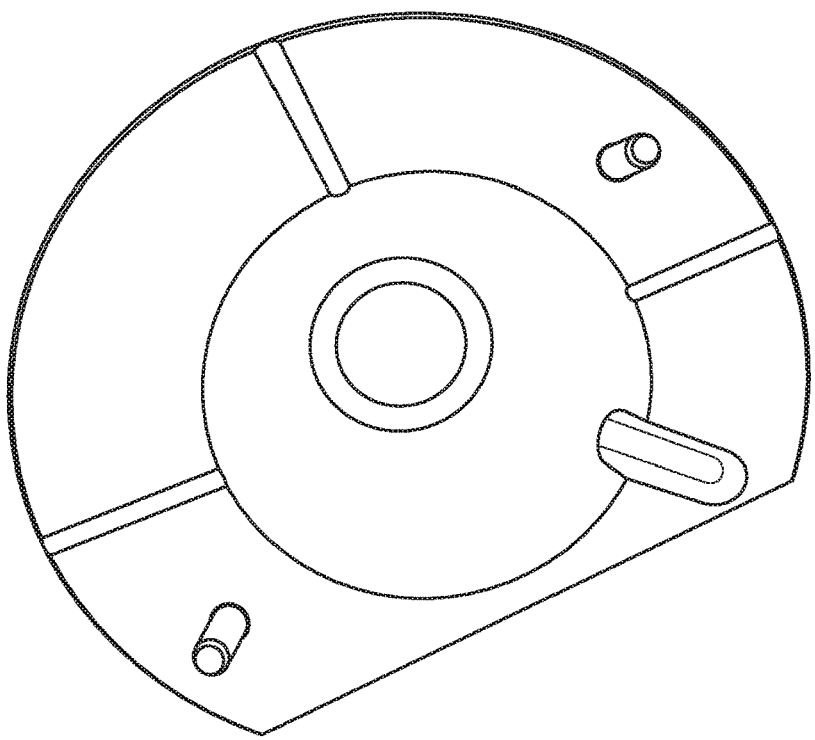
Figure 4C:
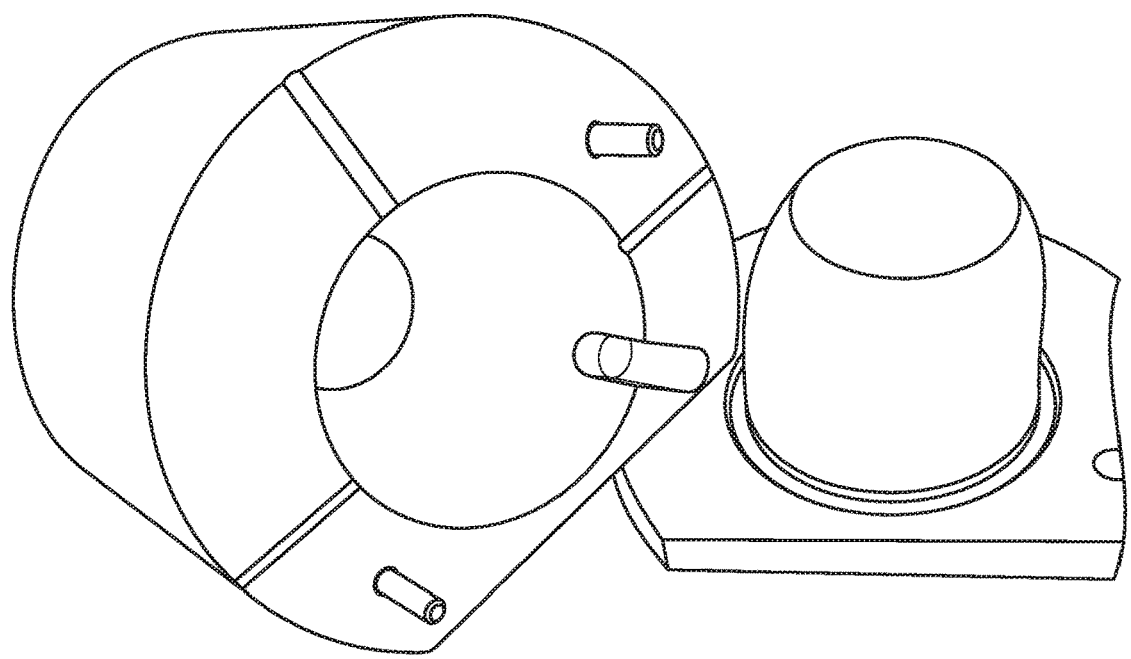
Figure 4D:
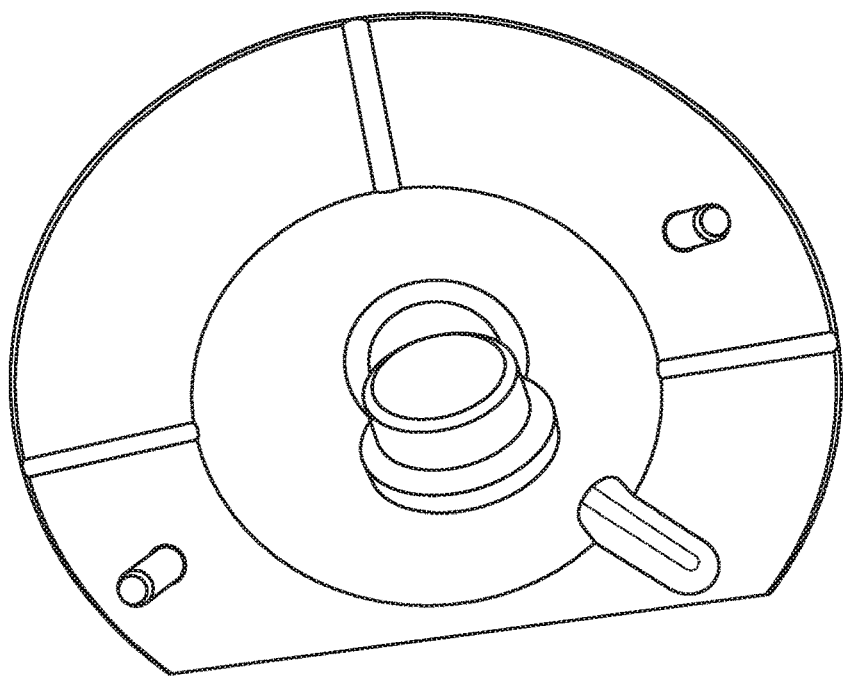
Figure 4E:
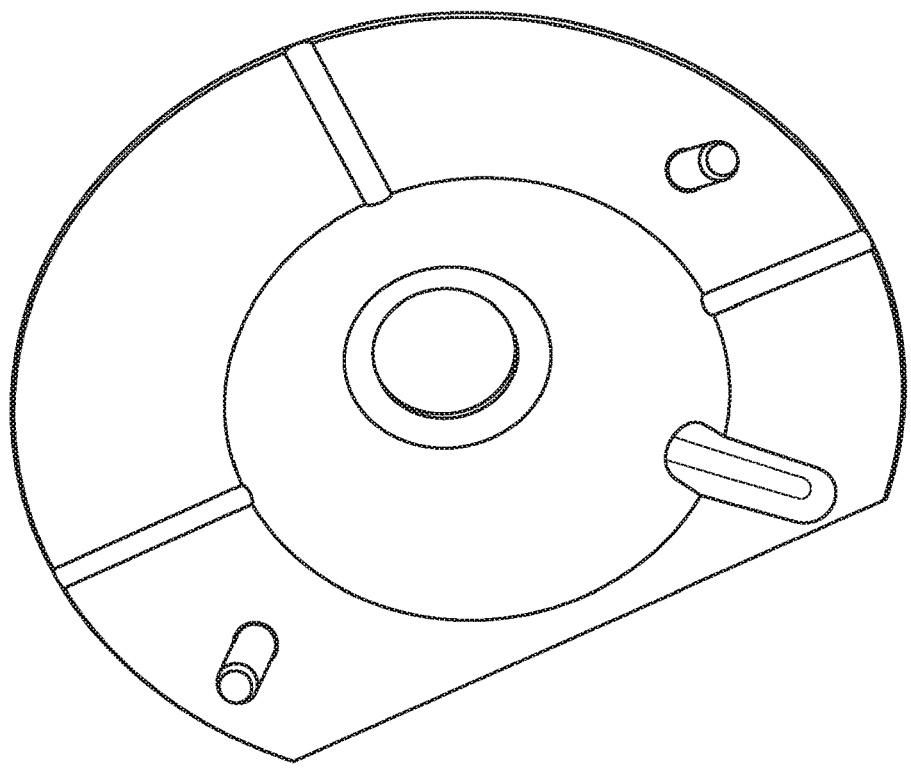
Figure 4F:
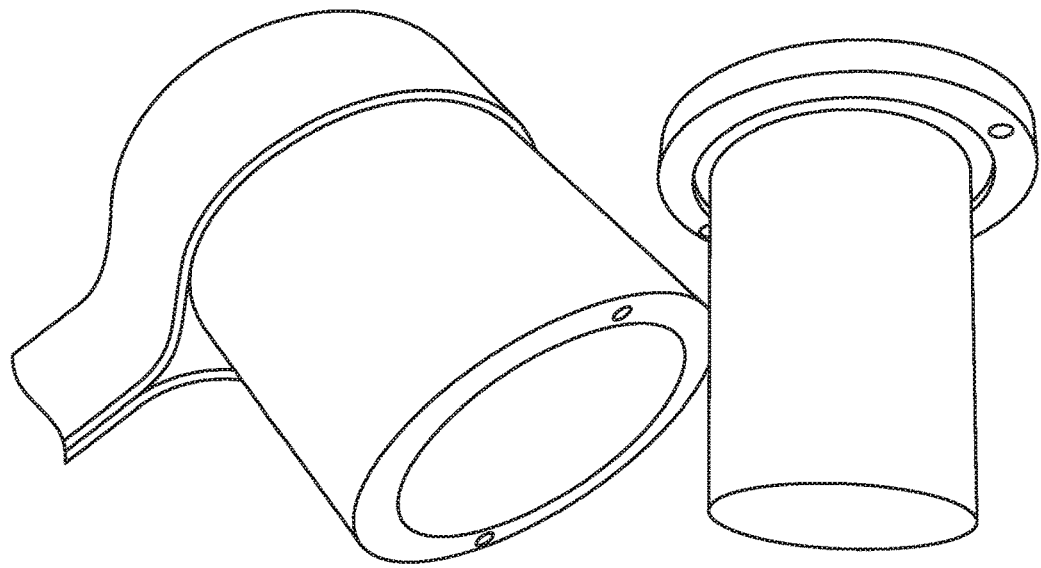
Figure 4G:
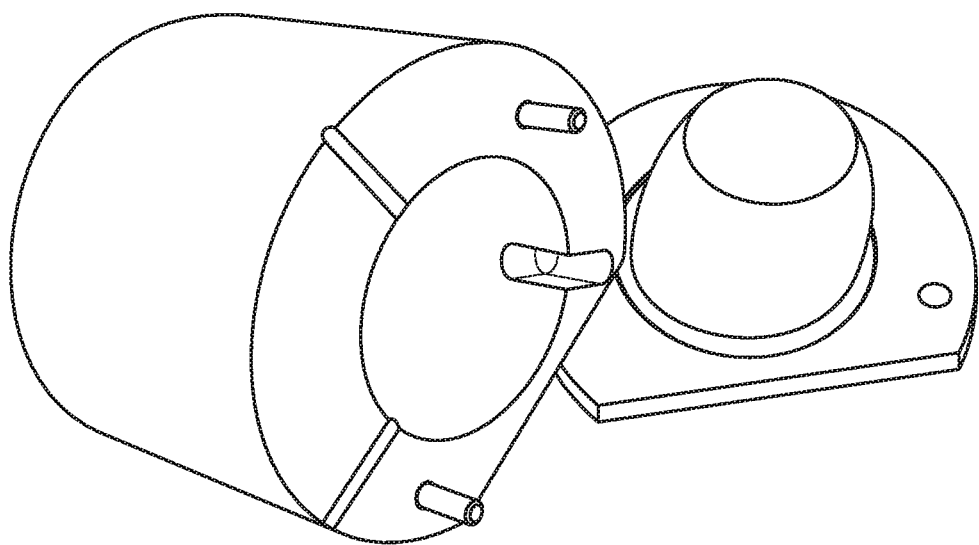
Figure 4H:
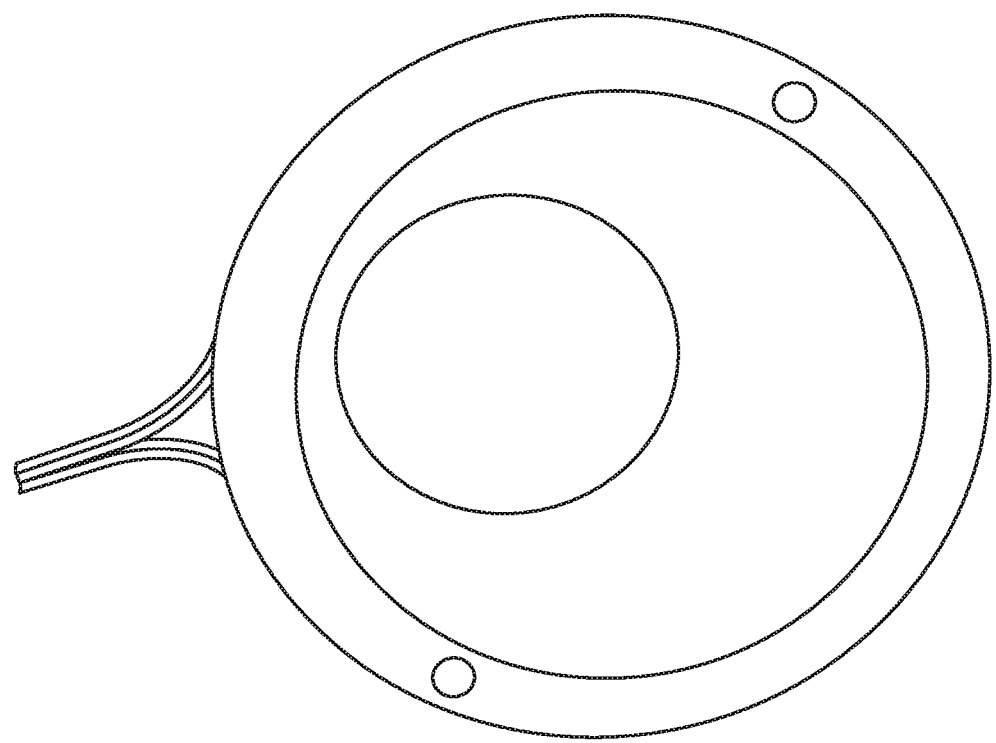
Figure 4I:
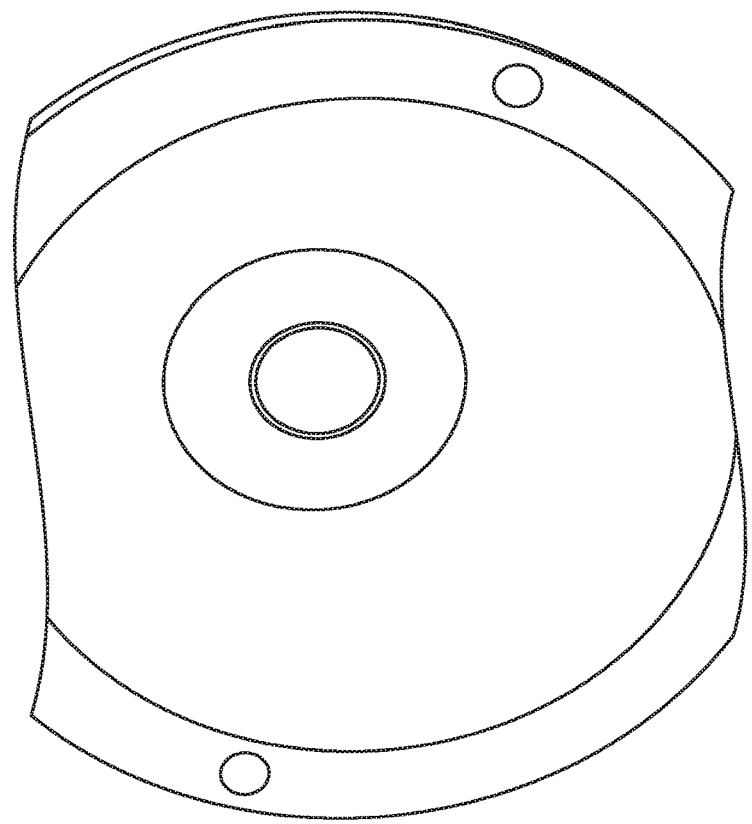
Figure 4J:
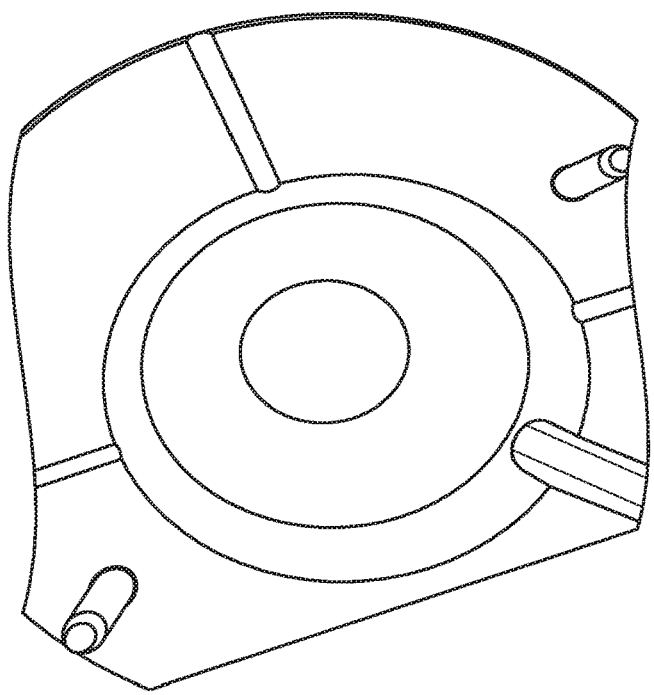
Figure 4K:
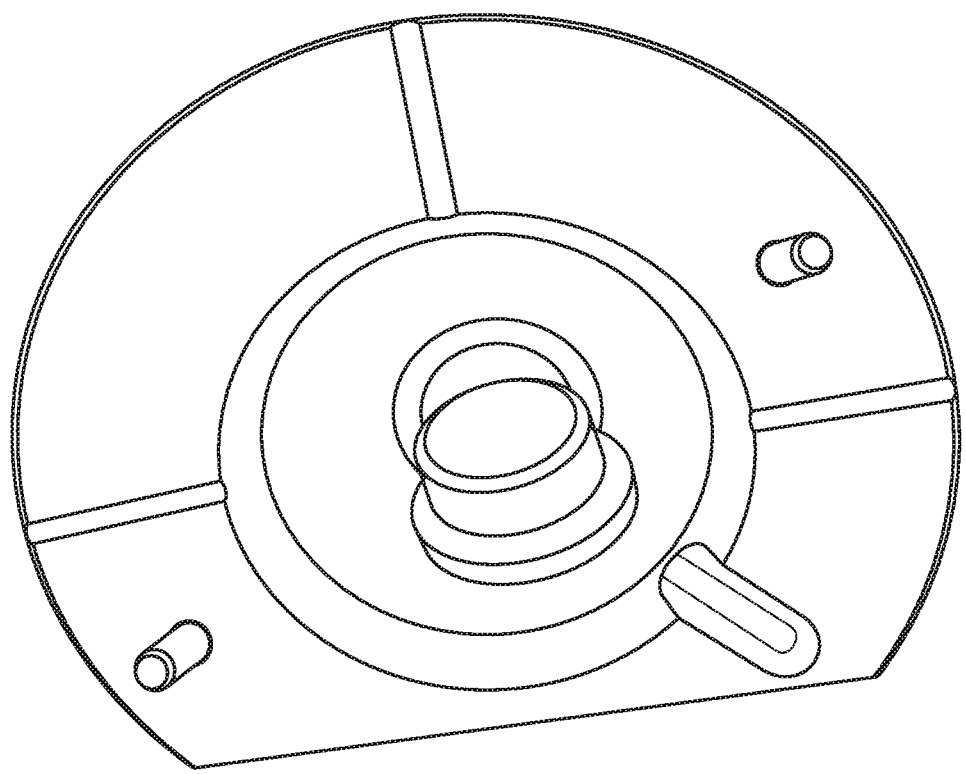
Figure 4L:
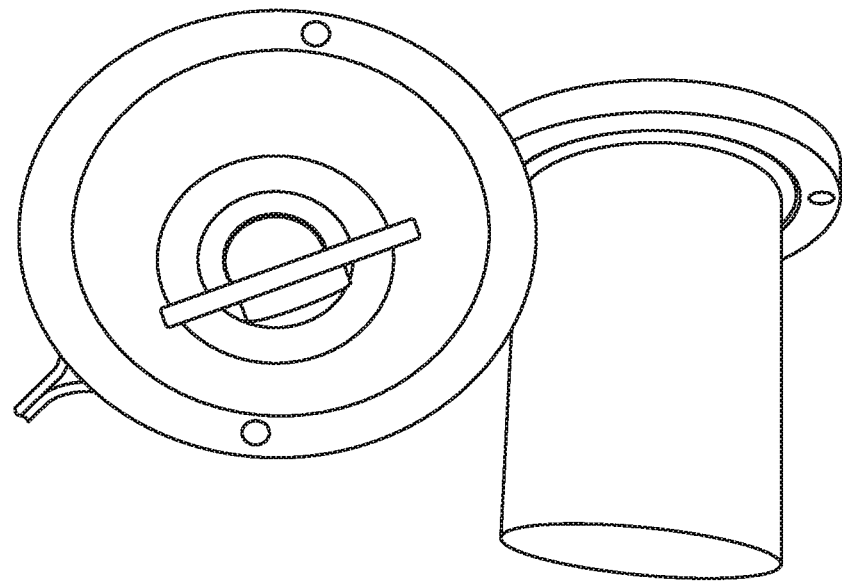

Edible tableware 100A of FIG. 1A-1, edible tableware 100B of FIG. 1B-1, and edible tableware 100C of FIG. 1C-1 may be formed via the process described below in connection with FIGS. 3A-3B, the description of which applying herein.

For the purposes of brevity and disclosure clarity, in FIGS. 1A-1-1C-2 only two tableware shapes (a cup and a straw) are shown. However, in embodiments, the tableware shape may be one or more of the following: a cup, a plate, a bowl, a mug, a straw, a utensil, and/or a combination thereof, to name a few. In embodiments, the tableware shape may affect the structure of the edible tableware, the mold used to make the edible tableware, and/or the process to make the edible tableware. For example, in the case where the edible tableware has a tableware shape of a plate, the edible tableware may only have a base. As another example, straw 110 may only have a sidewall.

FIG. 2 is an exemplary diagram illustrating the Waterfastness Rating test. The test requires, the sample, 25 milliliters of water at 100 degrees Celsius and treated with a food dye (e.g. a blue food dye), and an absorbent paper towel. Referring to FIG. 2, the Waterfastness Rating test is conducted on the edible tableware 100A resting on absorbent paper towel 204. At time T1, 25 milliliters of water 202A at about 100 degrees Celsius is poured into the edible tableware 100A and the timer is started. When the water contacts the absorbent paper towel, such that the dye is visible on the towel, the timer is stopped and the time T2 is recorded. The Waterfastness Rating is the time in seconds equal to T2−T1.

Using the process described below in connection with FIGS. 3A-3B, five pieces of cup-shaped edible tableware were made. Each of the five pieces of cup-shaped edible tableware had a capacity of about 60 milliliters. The respective sidewall thickness for each piece was one to two millimeters. The thickness of each respective edge of the respective sidewalls was up to four millimeters. The respective base thickness for each piece was about five millimeters. After preparing the five pieces of cup-shaped edible tableware, each of the five pieces was tested pursuant to the procedure for the Waterfastness Rating test, described above. The Waterfastness Rating obtained for each sample is provided in the table below.

| Samples | T1 | T2 | Waterfastness Rating |
|---|---|---|---|
| Sample #1 | 11:12 | 11:54 | 42 |
| Sample #2 | 11:12 | 12:18 | 66 |
| Sample #3 | 11:13 | 12:14 | 61 |
| Sample #4 | 11:13 | 12:22 | 69 |
| Sample #5 | 11:13 | 12:07 | 54 |

In embodiments, edible tableware may be made by performing the steps of the process illustrated in connection with FIG. 3A. Referring to FIG. 3A, in embodiments, the process for making edible tableware may begin at step S302. At step S302, ingredients and cooking equipment may be provided. The ingredients provided may be used, in embodiments, along with the cooking equipment, to make edible tableware. For example, edible tableware (e.g., edible tableware 100A, edible tableware 100B, edible tableware 100C) may be made with eggs, sugar, salt, water, flower, and/or a shortening. In embodiments, the water provided may include a first amount of water and a second amount of water. The second amount of water in embodiments, may be between 14 and 21 percent of the first amount of water. Continuing the example, the aforementioned ingredients may be combined, kneaded, baked, and/or cooled using an oven, a mechanical kneader, a refrigerator, and/or a mold.

In embodiments, ingredients to make edible tableware may include one or more of the following: eggs, sugar (e.g. granulated, confectioners, brown, superfine, sanding, date sugar, coconut sugar, maple sugar, honey, molasses, maple syrup, corn syrup, and/or agave syrup, to name a few), sugar substitutes, glaze (e.g. sugar-based glaze), salt (e.g. table salt and/or sea salt, to name a few), water, flour (e.g. all-purpose flower, whole wheat flour, sifted flour, bread flour, cake flour, cornstarch, and/or cornmeal, to name a few), dye, flavorings (e.g., chocolate, vanilla, rum, and/or brandy, to name a few), extracts (e.g. vanilla extract, almond extract, lemon extract, and/or mint extract, to name a few), cannabidiol, leavener (e.g. baking soda, yeast, and/or baking powder, to name a few), milk, shortening (e.g. butter, vegetable oil, and/or margarine to name a few), alternative milk (e.g. soy milk, rice milk, coconut milk, and/or nut milk, to name a few), spices (e.g., cinnamon, cloves, allspice, ginger, and/or nutmeg, to name a few), chocolate, ginger, fruit, oats, nuts, jams, peanut butter, almond butter, food coloring, and/or sprinkles, to name a few.

In embodiments, cooking equipment to make edible tableware may include one or more of the following: a mold, a rack oven, a deck oven, a spiral mixer, a diving arm mixer, a planetary mixer, a fork mixer, a wendel mixer, a bowl lifter-dumper, a mechanical kneader, a dough sheeter, a dough divider, and/or a refrigerator, to name a few.

Once the required ingredients and cooking equipment are provided, in embodiments, the process for making edible tableware may continue with step S304. At step S304, the dough to make the edible tableware is prepared using at least a portion of the ingredients. A more detailed description of the preparation of the dough is illustrated in connection with FIG. 3B. Referring to FIG. 3B, the process for preparing the dough may begin at step S324. At step S324, a first mixture is made by combining at least a portion of the ingredients. For example, the first mixture may be made by combining eggs, sugar, salt, and/or a first amount of water, to name a few. In embodiments, the first mixture may further include food coloring (e.g. a dye) and/or flavorings, to name a few. Once the first mixture is made, the process may continue with step S326. At step S326, in embodiments, the first mixture may be warmed to a temperature of substantially (e.g. around) fifty degrees Celsius.

At step S328, in embodiments, the warmed first mixture may be used to make a second mixture. The second mixture, in embodiments, may be made by combining the warmed first mixture with a shortening. The shortening may be one or more of: butter, and/or margarine, to name a few. Once the second mixture is made, the process may continue with step S330. At step S330, in embodiments, the second mixture may be warmed to a temperature of substantially (e.g. around) fifty-five degrees Celsius.

In embodiments, after the second mixture is made, at step S332, a third mixture may be made. The third mixture, in embodiments, may be made by mixing at least the second mixture and flour. In embodiments, the third mixture is made by mixing at least the second mixture and flour for substantially three minutes. In embodiments, the flour is sifted flour. The third mixture, at step S334, may then be cooled to substantially room temperature. The third mixture may be cooled over a first time range between and including four hours and six hours. In embodiments, the third mixture may be covered while being cooled to substantially room temperature. The cooled third mixture, in embodiments, may be the dough to make the edible tableware. In embodiments, the weight of the dough may be: (1) between 45 and 49 percent flour, (2) substantially 19 percent sugar, (3) substantially 9 percent eggs, (4) substantially 17 percent shortening, (5) substantially 6 percent water, and/or (6) less than 3 percent salt.

After preparing the dough, in embodiments, the edible tableware may be made. Referring back to FIG. 3A, in embodiments, the process for making edible tableware may continue with step S306. At step S306, the prepared dough is kneaded for substantially three minutes. In embodiments, the prepared dough may be kneaded using a mechanical kneader. In embodiments, the prepared dough may be manually kneaded. In the case where the prepared dough is manually kneaded, in embodiments, the prepared dough may be kneaded for more than substantially three minutes. The kneaded dough, at step S308, may then be exposed for substantially one hour. In embodiments, the kneaded dough may be exposed by placing the dough on a counter, in a bowl, on a cutting board, and/or on a surface, to name a few. In embodiments, at the expiration of substantially one hour, the kneaded dough may be at room temperature. In embodiments, the kneaded dough may need to be exposed for longer than substantially one hour to result in the kneaded dough being at room temperature.

The processes for making edible tableware may continue with step S310. At step S310, in embodiments, a fourth mixture is made by combining the kneaded dough with a second amount of water. In embodiments, the second amount of water may be dependent on the first amount of water. For example, the second amount of water may be between 14 percent and 21 percent of the first amount of water (added to the first mixture above in connection with step S324).

At step S312, the fourth mixture, in embodiments, may be kneaded for a second time range between and including ten minutes and fifteen minutes. In embodiments, the fourth mixture may be kneaded using a mechanical kneader. In embodiments, the fourth mixture may be manually kneaded. In the case where the fourth mixture is manually kneaded, in embodiments, the fourth mixture may be kneaded for more than the second time range.

Once kneaded, in embodiments, the fourth mixture may be cooled. At step S314, in embodiments, the fourth mixture may be cooled to a temperature range, between and including, three degrees Celsius and ten degrees Celsius. At step S316, the fourth mixture may, in embodiments, be rested for substantially three minutes. Resting, in embodiments, may be similar to exposing, described above in connection with step S308, the description of which applying herein. In embodiments, resting may be accomplished in additional locations, including, but not limited to: a refrigerator, an oven, and/or a freezer, to name a few. In embodiments, steps S314 and S316 may occur at substantially the same time. In embodiments, step S316 may occur before step S314.

In embodiments, the process of making edible tableware may continue with step S318. At step S318, at least a portion of the fourth mixture is molded by placing the at least a portion of the fourth mixture into one or more molds. In embodiments, a portion and/or all of the fourth mixture may be placed into the one or more molds. The one or more molds may, in embodiments, be of a tableware shape the fourth mixture will be.

Exemplary molds are illustrated in connection with FIGS. 4A-4L and 5A-5I. Referring to FIGS. 4A-4L, a mold for a cup may include a two-piece outer mold and a one-piece inner mold. The two-piece outer mold includes a cylindrical outer mold that includes an opening at the base of the mold and molds the exterior sidewalls of the edible tableware. A base piece with a projection that extends through the opening at the base of the mold is placed within the cup shaped mold. The one-piece inner mold forms the interior walls of the edible tableware (e.g. edible tableware 100A).

In embodiments, a mold for a cup shaped edible tableware with a handle (e.g. edible tableware 100B) may include a two-piece outer mold and a one-piece inner mold. The two-piece outer mold is divided along a vertical axis that intersects with the handle, which may allow for the finished cup shaped edible tableware to be removed from the mold after removing one of the pieces of the outer mold. The one-piece inner mold forms the interior walls of the cup shaped edible tableware with a handle. In embodiments, the one-piece inner mold may be pressed into the at least a portion of the fourth mixture placed in the inner mold in order to form the cup shaped edible tableware with a handle.

Figure 5A:
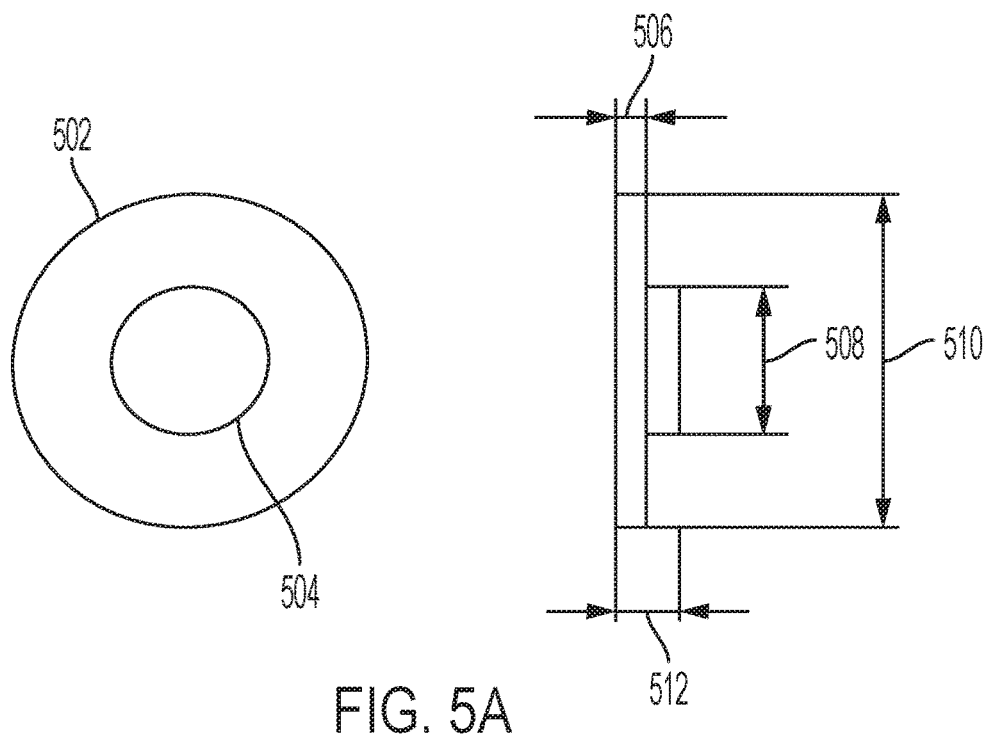
FIG. 5A is a top view and corresponding side view of an exemplary piece of an exemplary mold for making edible tableware in accordance with exemplary embodiments of the present invention.

More detailed illustrations of the one or more molds are shown in connection with FIGS. 5A-5I. Referring to FIG. 5A, a top view of a top piece of a mold and corresponding side view of the top piece is shown. The top piece, in embodiments, may have an exterior radius 502, diameter 510 and a top portion width 506. The top piece may also include a protrusion with a radius 504 and diameter 508. The top piece may have a width 512. The width 512, top portion width 506, diameter 508 and radius 504 may control the shape of the interior of the edible tableware to be made. For example, the capacity of the edible tableware may be dependent on the depth of the interior of the edible tableware and the radius of the interior of the edible tableware. The depth of the interior of the edible tableware, in embodiments, may be the width 512 subtracted from the top portion width 506, resulting in the width of the protrusion of the top piece of the mold. The radius of the interior of the edible tableware may be based on the diameter 508 of the protrusion.

Figure 5B:
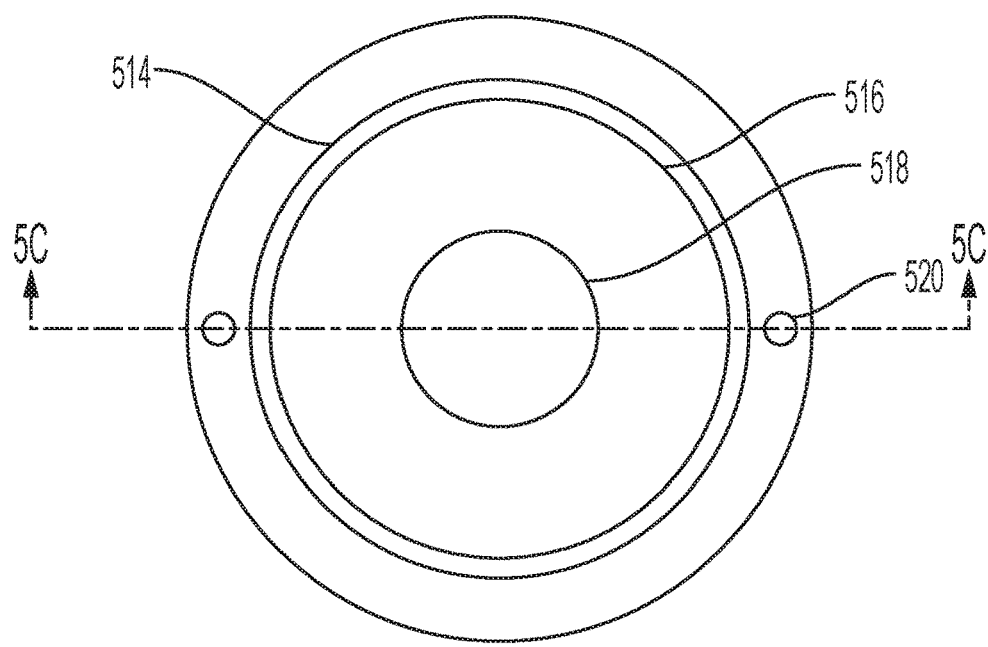
FIG. 5B is a top view of an exemplary piece of another mold for making edible tableware in accordance with exemplary embodiments of the present invention.
Figure 5C:
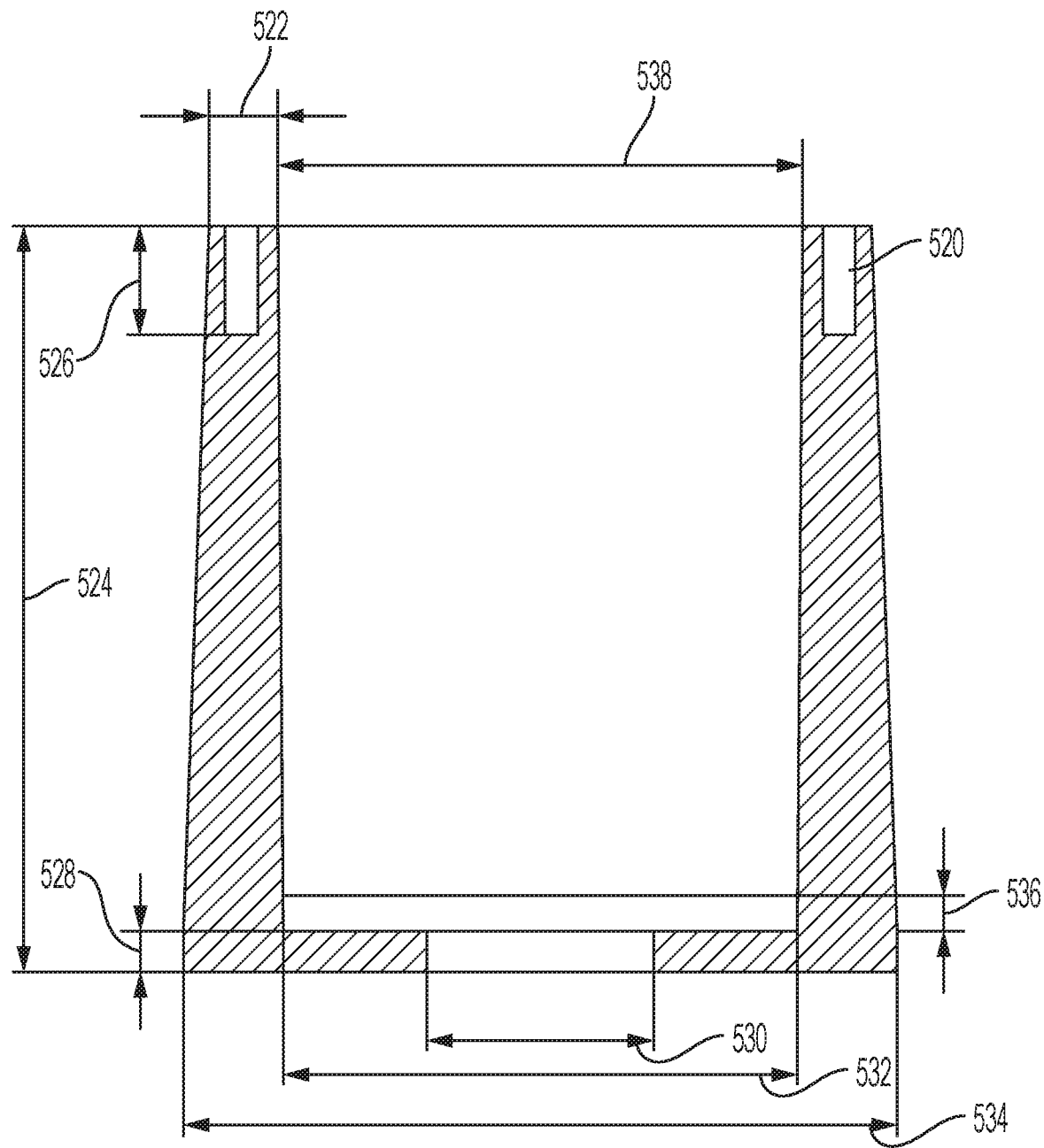
FIG. 5C is a cross-sectional view of the exemplary piece of FIG. 5B in accordance with exemplary embodiments of the present invention.

Referring to FIG. 5B, a top view of an exemplary piece of another mold for making edible tableware in accordance with exemplary embodiments of the present invention is shown. The piece shown in connection with FIG. 5B, in embodiments, may be a bottom piece of a mold. The bottom piece, in embodiments, may include one or more of the following: two holes 520 for affixing the bottom piece to a top piece, an exterior radius 514 (and exterior diameter 538) of the inner wall of the bottom piece, an interior radius 516 (and interior diameter 532) of the inner wall of the bottom piece, and a radius 518 (and diameter 530) of the opening at the base of the bottom piece. Referring to FIG. 5C, a cross section of the bottom piece of FIG. 5B is shown. As shown in FIG. 5C, the inner wall of the bottom piece tapers towards the base of the bottom piece—resulting in the exterior radius 514 (e.g. the radius at the top of the bottom piece) and the interior radius 516 (e.g. the radius towards the bottom of the bottom piece). In embodiments, the interior of the bottom piece may have a depth 524. The tapered portion of the bottom piece, in embodiments, may end before reaching the depth 524 of the interior of the bottom piece, leaving a straight (not tapered) portion of the interior of the bottom piece with a depth 536. The straight portion, in embodiments, may be to mold the base of the edible tableware. The depth 536 may control the width of the base of the edible tableware. The two holes 520, in embodiments, may have a depth 526 and be centered such that each hole is a distance 522 from the outer side of the bottom piece. The opening, in embodiments, may have a depth 528.

Figure 5D:
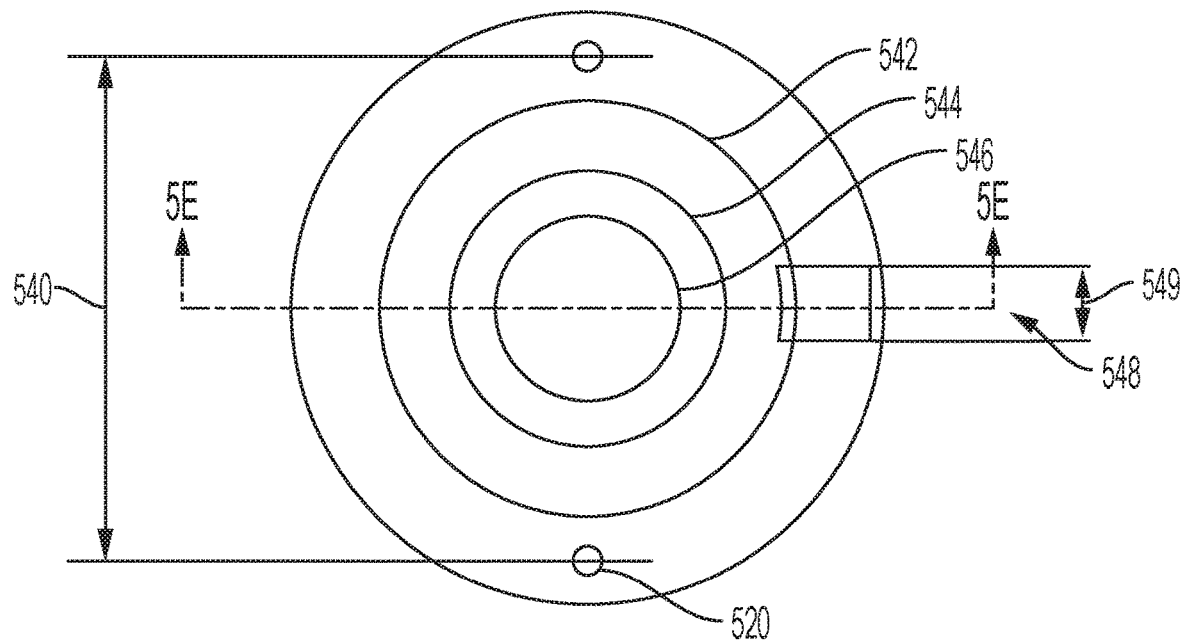
FIG. 5D is a top view of an exemplary bottom piece of a mold for making edible tableware with a handle in accordance with exemplary embodiments of the present invention.
Figure 5E:
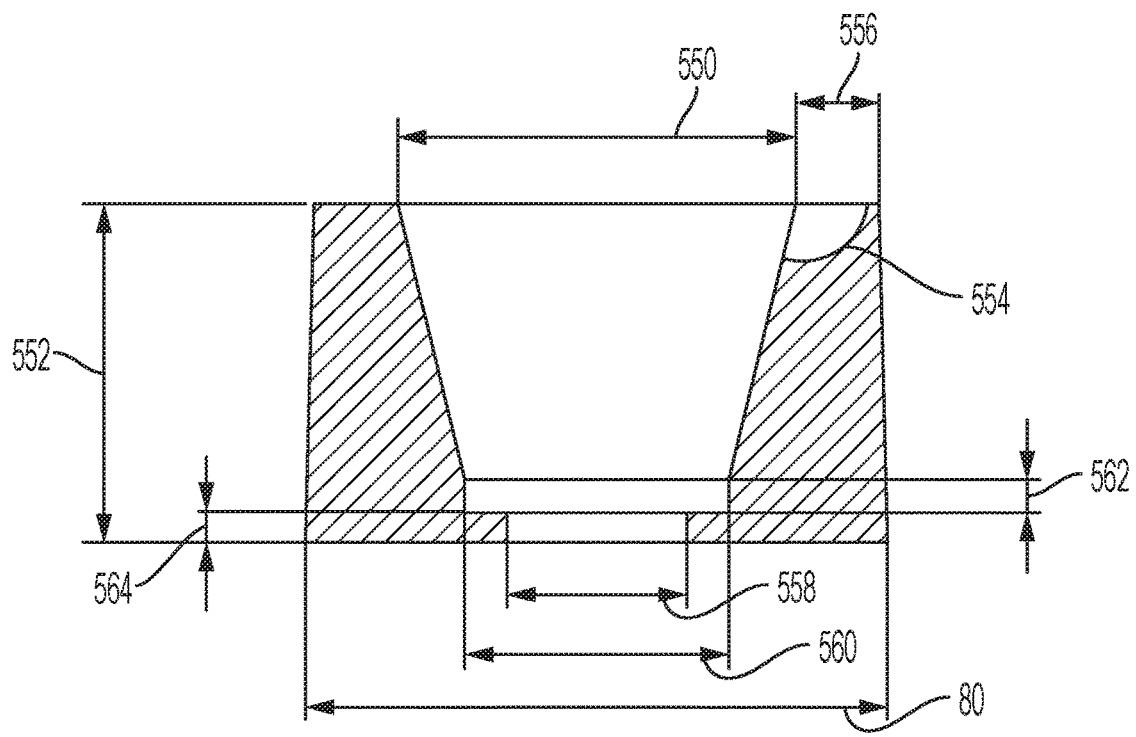
FIG. 5E is a cross-sectional view of the exemplary bottom piece of FIG. 5D in accordance with exemplary embodiments of the present invention.

Referring to FIGS. 5D and 5E, an exemplary bottom piece of a mold for making edible tableware with a handle 548 is shown in a top view (FIG. 5D) and a cross-sectional view (FIG. 5E). Referring to FIG. 5D, the exemplary bottom piece, in embodiments, may include one or more of the following: a handle 548, two holes 520 for affixing a bottom piece of the mold to a top piece of the mold, an exterior radius 542 (and exterior diameter 550) of the inner wall of the bottom piece, an interior radius 544 (and interior diameter 560) of the inner wall of the bottom piece, and a radius 518 (and diameter 558) of the opening at the base of the bottom piece. In embodiments, the handle may have a width 549. In embodiments, the two holes 520 are separated by a distance 540. Referring to FIG. 5E, the handle 548 may have a width 556 and be curved at an angle 554. As shown in FIG. 5E, the inner wall of the bottom piece tapers towards the base of the bottom piece—resulting in the exterior radius 542 (e.g. the radius at the top of the bottom piece) and the interior radius 544 (e.g. the radius towards the bottom of the bottom piece). In embodiments, the interior of the bottom piece may have a depth 552. The tapered portion of the bottom piece, in embodiments, may end before reaching the depth 552 of the interior of the bottom piece, leaving a straight (not tapered) portion of the interior of the bottom piece with a depth 562. The straight portion, in embodiments, may be to mold the base of the edible tableware. The depth 562 may control the width of the base of the edible tableware. The opening, in embodiments, may have a depth 564.

Figure 5F:
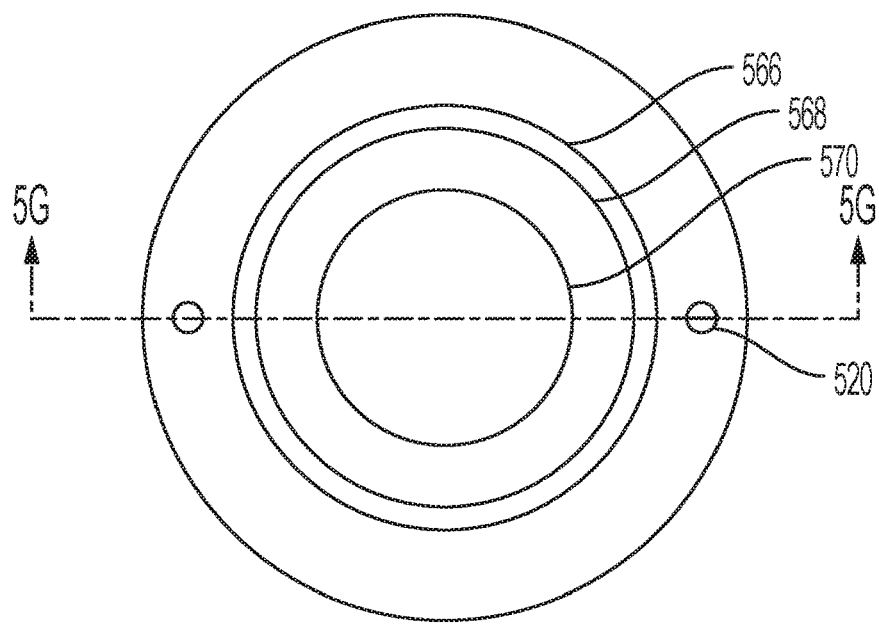
FIG. 5F is a top view of an exemplary of another piece of a mold for making edible tableware in accordance with exemplary embodiments of the present invention.
Figure 5G:
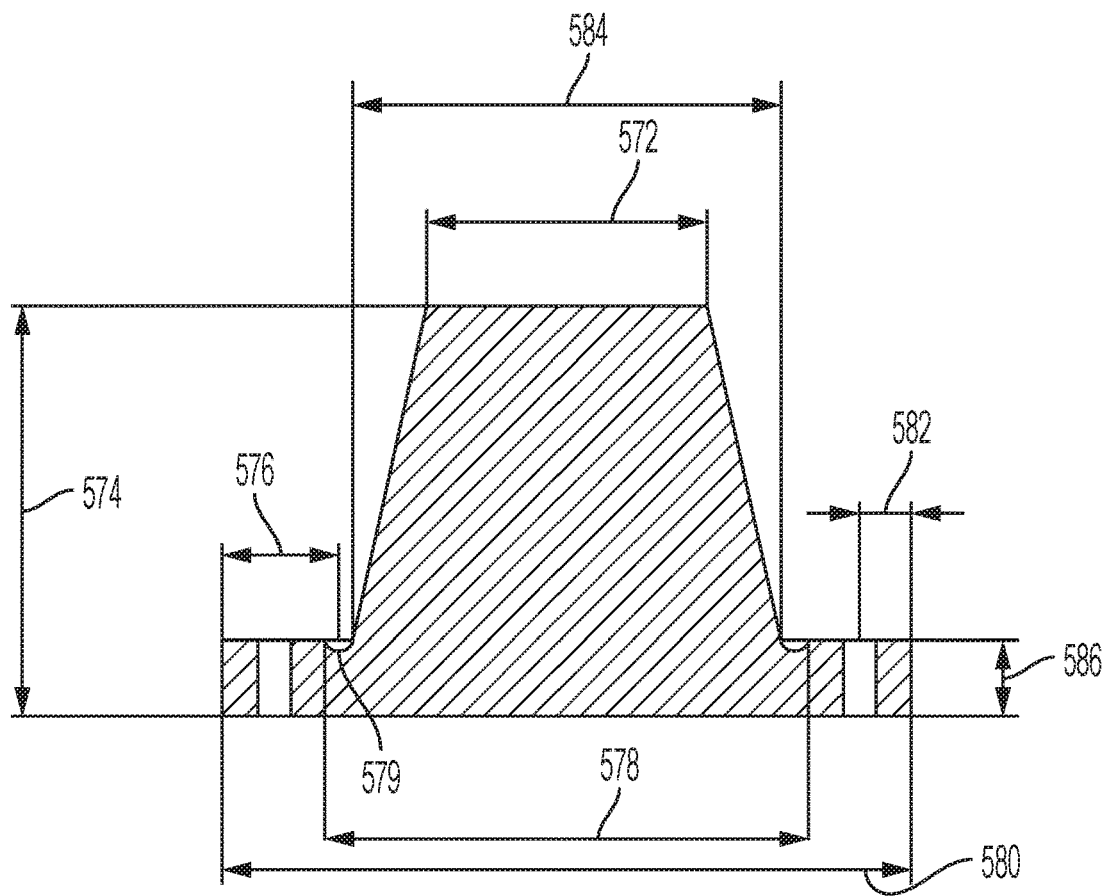
FIG. 5G is a cross-sectional view of the exemplary piece of FIG. 5F in accordance with exemplary embodiments of the present invention.

Referring to FIGS. 5F and 5G, an exemplary piece of an additional a mold for making edible tableware is shown in a top view (FIG. 5F) and a cross-sectional view (FIG. 5G). Referring to FIG. 5F, the exemplary piece, in embodiments, may include one or more of the following: two holes 520 for affixing a bottom piece of the mold to a top piece of the mold, an exterior radius 566 (and exterior diameter 584) of the inner wall of the bottom piece, an interior radius 568 (and interior diameter 572) of the inner wall of the bottom piece, and a radius 570 of the opening at the base of the bottom piece. Referring to FIG. 5G, to facilitate placement of the bottom piece into an oven, the bottom piece may have two notches 579 which may be designed to receive one or more parts of an oven to hold the mold when baking. As shown in FIG. 5G, the inner wall of the bottom piece tapers towards the base of the bottom piece—resulting in the exterior radius 566 (e.g. the radius at the top of the bottom piece) and the interior radius 568 (e.g. the radius towards the bottom of the bottom piece). In embodiments, the interior of the bottom piece may have a depth 574. In embodiments, the two holes 520 may have a depth 586 and be centered such that the center of each hole is a distance 582 away from the end of the bottom piece. The bottom piece, in embodiments, may have a diameter 580 that extends a distance 576 past the exterior radius 566. The larger diameter 580, in embodiments, may also facilitate placement of the bottom piece into an oven.

Figure 5H:
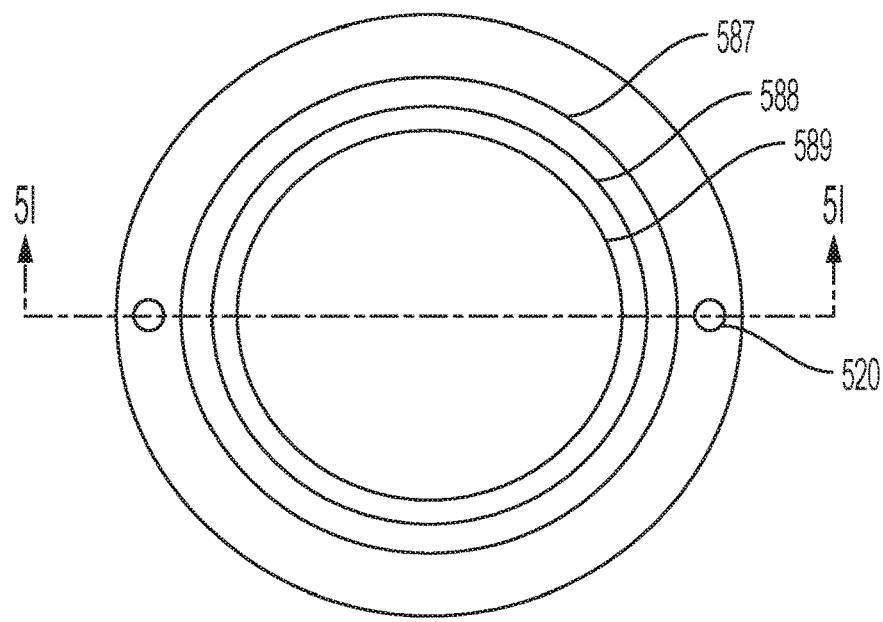
FIG. 5H is a top view of an additional exemplary piece of a mold for making edible tableware in accordance with exemplary embodiments of the present invention.
Figure 5I:
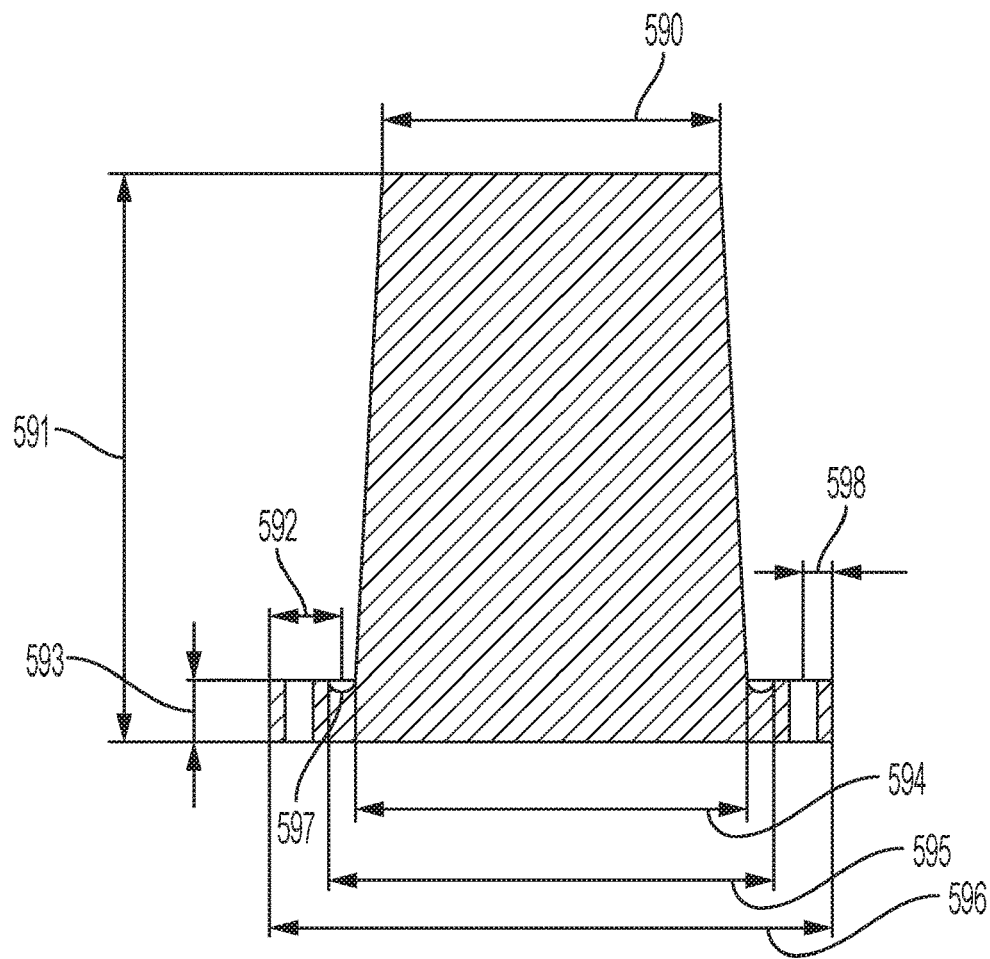
FIG. 5I is a cross-sectional view of the exemplary piece of FIG. 5H in accordance with exemplary embodiments of the present invention.

Referring to FIGS. 5H and 5I, another piece of an additional a mold for making edible tableware is shown in a top view (FIG. 5H) and a cross-sectional view (FIG. 5I). Referring to FIG. 5H, the exemplary piece, in embodiments, may include one or more of the following: two holes 520 for affixing a bottom piece of the mold to a top piece of the mold, an exterior radius 587 (and exterior diameter 594) of the inner wall of the bottom piece, an interior radius 588 (and interior diameter 590) of the inner wall of the bottom piece, and a radius 589 of the opening at the base of the bottom piece. Referring to FIG. 5G, to facilitate placement of the bottom piece into an oven, the bottom piece may have two notches 597. As shown in FIG. 5I, the inner wall of the bottom piece tapers towards the base of the bottom piece—resulting in the exterior radius 587 (e.g. the radius at the top of the bottom piece) and the interior radius 588 (e.g. the radius towards the bottom of the bottom piece). In embodiments, the interior of the bottom piece may have a depth 591. In embodiments, the two holes 520 may have a depth 593 and be centered such that the center of each hole is a distance 598 away from the end of the bottom piece. The bottom piece, in embodiments, may have a diameter 596 that extends a distance 592 past the exterior radius 587. The larger diameter 596, in embodiments, may also facilitate placement of the bottom piece into an oven.

In embodiments, the molds and mold pieces described in connection with FIGS. 5A-5I made be made out of steel and/or ceramic, to name a few.

Referring back to FIG. 3A, the process of making edible tableware may continue with step S320. At step S320, the fourth mixture is baked in the mold. In embodiments, the at least a portion of the fourth mixture that was placed in the mold and the mold may both be placed in an oven to bake. In embodiments, the fourth mixture may be baked at a predetermined temperature for a predetermined amount of time. In embodiments, the predetermined temperature is a temperature range between and including 200 degrees Celsius and 260 degrees Celsius. In embodiments, the predetermined amount of time may be a range between and including 3 minutes and 10 minutes. In embodiments, the predetermined temperature and/or predetermined amount of time may be based at least in part on the tableware shape of the mold and/or the tableware shape of the edible tableware being made. For example, smaller pieces of edible tableware, such as cup shaped edible tableware and utensil shaped edible tableware, may be baked at a predetermined temperature range between and including 220 degrees Celsius and 260 degrees Celsius for a predetermined time range between and including 3 minutes and 7 minutes. As another example, larger pieces of edible tableware, such as bowl shaped edible tableware and plate shaped edible tableware, may be baked at a predetermined temperature range between and including 200 degrees Celsius and 240 degrees Celsius for a predetermined time range between and including 7 minutes and 10 minutes.

Once the fourth mixture is baked in the mold, at step S322, in embodiments, the fourth mixture may be removed from the mold. In embodiments, after the predetermined amount of time has elapsed, the mold containing the at least a portion of the fourth mixture may be removed from the oven. After removing the mold, in embodiments, the base piece may be pushed upwards through the hole in the cylindrical outer mold to remove the edible tableware from the mold. The edible tableware, in embodiments, may be used as a container for serving warm liquids and can hold said liquids for at least forty minutes without leaking (e.g. a Waterfastness Rating of 40 minutes). In some embodiments, a glaze may be added to the interior of the edible tableware. Alternatively, only a portion of the interior may be glazed, for example, only the base.

In embodiments, the steps of the process described in connection with FIGS. 3A-3B may be rearranged or omitted.

One of ordinary skill in the art would understand that when working with dough in general it is important to remain within specific temperature ranges to optimize dough characteristics, such as, for example, taste, rise and consistency. For the purposes of the present disclosure, the term 'substantially' as used in reference to a specified temperature should be understood to mean within a range around the specified temperature in which the dough characteristics remain at an optimal level. For example, 'substantially 50 degrees' should be understood to mean within a range of 45 degrees and 55 degrees, or some other range around 50 degrees in which dough characteristics remain optimized.

Without being bound by theory, it is believed that the combination of multiple kneading steps and multiple cooling steps result in a dough that is both dense and elastic. This dough, when cooked, creates a surface that is resistant to liquid, even at high heat.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method for creating edible tableware comprising:
   (a) preparing dough by performing the following steps:
      (1) making a first mixture by combining at least the following:
         (A) eggs;
         (B) sugar;
         (C) salt; and
         (D) a first amount of water;
      (2) warming the first mixture to substantially fifty degrees Celsius;
      (3) making a second mixture by combining the first mixture with a shortening including one or more of:
         (A) butter; and
         (B) margarine;
      (4) warming the second mixture to substantially fifty-five degrees Celsius;
      (5) making a third mixture by mixing at least the second mixture and flour for substantially three minutes; and
      (6) cooling the third mixture to substantially room temperature over a first time range between and including four hours and six hours,
      wherein the cooled third mixture is the dough, and
      wherein the dough is made from a composite mixture having a weight made up of:
         (1) between 45 percent and 49 percent flour;
         (2) between 18 percent and 20 percent sugar;
         (3) between 8 percent and 10 percent eggs;
         (4) between 16 percent and 18 percent shortening; and
         (5) below 3 percent salt;
   (b) kneading the dough for substantially three minutes;
   (c) resting the dough for substantially one hour,
      wherein the dough is at room temperature at the expiration of substantially one hour;
   (d) making a fourth mixture by combining the dough with a second amount of water;
   (e) kneading the fourth mixture for a second time range between and including ten minutes and fifteen minutes,
      wherein the fourth mixture is made up of between 5 and 7 percent water;
   (f) cooling the fourth mixture to a first temperature range between and including three degrees Celsius and ten degrees Celsius;
   (g) resting the fourth mixture for substantially three minutes;
   (h) molding at least a portion of the fourth mixture via a mold by placing the at least a portion of the fourth mixture into the mold,
      wherein the mold is a tableware shape,
      wherein the mold is a two-piece outer mold comprising an outer mold portion and a base piece that extends through an opening in the outer mold portion;
   (i) baking the at least a portion of the fourth mixture in the mold at a predetermined temperature for a predetermined amount of time,
      wherein the predetermined temperature is based at least in part on the tableware shape, and
      wherein the predetermined amount of time is based at least in part on the tableware shape; and
   (j) removing the at least a portion of the fourth mixture from the mold, wherein the step of removing comprises extending the base piece through the opening in the outer mold portion,
      wherein the baked at least a portion of the fourth mixture is an edible tableware comprising at least a base having a first side on an interior end of the base and a second side on an exterior end of the base,
      wherein the base has a first predetermined thickness spanning the first side to the second side,
      wherein the edible tableware has a Waterfastness Rating of at least forty minutes,
      wherein the tableware shape is a cup, and
      wherein the edible tableware has a sidewall with a thickness of less than 3 mm.

2. The method of claim 1, wherein the sidewall includes a first end and a second end,
   wherein the first end is at least partially in contact with the first side of the first wall,
   wherein the base and the sidewall form the shape of the cup,
   wherein a majority portion of the sidewall between the first end and the second end has a first thickness of less than three millimeters, and
   wherein a majority portion of the base has a thickness of less than six millimeters.

3. The method of claim 2, wherein the cup comprises an edge portion disposed at the first end and the edge portion has a third thickness of less than five millimeters.

4. The method of claim 2, wherein the Waterfastness rating of the edible tableware is at least 54 minutes.

5. The method of claim 2, wherein the predetermined temperature is between and including two-hundred-twenty degrees Celsius and two-hundred-sixty degrees Celsius.

6. The method of claim 2, wherein the predetermined amount of time is between and including three minutes and seven minutes.

7. The method of claim 1, wherein the predetermined temperature is between and including two-hundred degrees Celsius and two-hundred-sixty degrees Celsius.

8. The method of claim 1, wherein the predetermined amount of time between and including three minutes and ten minutes.

9. The method of claim 1, wherein the second amount of water is between 14 percent and 21 percent of the first amount of water.

\* \* \* \* \*